US009020819B2

(12) United States Patent
Saitoh et al.

(10) Patent No.: US 9,020,819 B2
(45) Date of Patent: Apr. 28, 2015

(54) RECOGNITION DICTIONARY SYSTEM AND RECOGNITION DICTIONARY SYSTEM UPDATING METHOD

(75) Inventors: Daisuke Saitoh, Yokosuka (JP); Minoru Tomikashi, Yokohama (JP); Takeshi Oono, Yokosuka (JP); Keiko Katsuragawa, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 1808 days.

(21) Appl. No.: 11/646,594

(22) Filed: Dec. 28, 2006

(65) Prior Publication Data
US 2007/0162281 A1    Jul. 12, 2007

(30) Foreign Application Priority Data

Jan. 10, 2006    (JP) .................................. 2006-002305
Oct. 27, 2006    (JP) .................................. 2006-293098

(51) Int. Cl.
*G10L 15/00*    (2013.01)
*G10L 15/04*    (2013.01)
*G06F 17/27*    (2006.01)
*G10L 15/197*   (2013.01)

(52) U.S. Cl.
CPC .......... *G06F 17/2795* (2013.01); *G10L 15/197* (2013.01)

(58) Field of Classification Search
USPC .................... 704/10, 251, 270, 275
See application file for complete search history.

(56) References Cited

U.S. PATENT DOCUMENTS

| | | | | |
|---|---|---|---|---|
| 6,208,971 B1* | 3/2001 | Bellegarda et al. | ........... | 704/275 |
| 6,374,224 B1* | 4/2002 | Horiguchi et al. | ............ | 704/266 |
| 6,393,399 B1* | 5/2002 | Even | .............................. | 704/257 |
| 7,103,542 B2* | 9/2006 | Doyle | ........................... | 704/231 |
| 7,222,073 B2* | 5/2007 | Julia et al. | ..................... | 704/257 |

(Continued)

FOREIGN PATENT DOCUMENTS

| | | |
|---|---|---|
| JP | 2003-323192 A | 11/2003 |
| JP | 2004-086029 A | 3/2004 |

(Continued)

OTHER PUBLICATIONS

Stefan Ortmanns et al.; A Word Graph Algorithm for Large Vocabulary Continuous Speech Recognition; Computer Speech & Language. vol. 11; 1997; pp. 43-72; Lehrstuhl fur Informatik VI, RWTH Aachen, University of Technology; Germany.

(Continued)

*Primary Examiner* — Shaun Roberts
(74) *Attorney, Agent, or Firm* — Global IP Counselors, LLP

(57) ABSTRACT

A recognition dictionary system includes a variant term accumulation unit, a variant frequency analysis unit, and a recognition dictionary update unit. The variant term accumulation unit is configured to accumulate and store a first variant term that has a meaning equivalent to a base term stored in a recognition dictionary and has first character string information that is different from character string information of the base term. The variant frequency analysis unit is configured to analyze an occurrence frequency of the first variant term accumulated and stored in the variant term accumulation unit and to determine the first variant term as a principal variant term when the occurrence frequency is higher than a first prescribed value. The recognition dictionary update unit is configured to update the recognition dictionary to register the principal variant term in the recognition dictionary as being associated with the base term.

15 Claims, 20 Drawing Sheets

(56) References Cited

U.S. PATENT DOCUMENTS

| | | | |
|---|---|---|---|
| 7,289,950 B2* | 10/2007 | Bellegarda et al. | 704/10 |
| 7,398,209 B2* | 7/2008 | Kennewick et al. | 704/255 |
| 7,693,720 B2* | 4/2010 | Kennewick et al. | 704/275 |
| 2002/0169594 A1* | 11/2002 | Yasuda et al. | 704/5 |
| 2003/0050772 A1* | 3/2003 | Bennett | 704/9 |
| 2003/0120493 A1* | 6/2003 | Gupta | 704/270.1 |
| 2003/0233251 A1* | 12/2003 | Haskell et al. | 705/2 |
| 2006/0100871 A1* | 5/2006 | Choi et al. | 704/254 |
| 2007/0112554 A1* | 5/2007 | Goradia | 704/4 |

FOREIGN PATENT DOCUMENTS

| | | |
|---|---|---|
| JP | 2004-309654 A | 11/2004 |
| JP | 2005-043461 A | 2/2005 |
| JP | 2005-148151 A | 6/2005 |
| JP | 2005-164837 A | 6/2005 |
| JP | 2005-283394 A | 10/2005 |

OTHER PUBLICATIONS

Frank Wessel et al.; Using Posterior Word Probabilities for Improved Speech Recognition; Proceedings of IEEE ICASSP2000; Jun. 2000; pp. 1587-1590; Lehrstuhl fur Informatik VI, RWTH Aachen, University of Technology; Germany.

Takao Murakami et al.; Automatic Recognition of Japanese Vowel Sequences Using Structural Representation of Speech; Technical Report of IEICE; pp. 1-6; Graduate School of Information Science and Technology, University og Tokyo; Japan.

Elichi Tsuboka et al.; Speech Recognition Based on the Kullback-Leibler Divergence as the Distance Measure; Technical Report of IEICE SP95-19 (Jun. 1995); pp. 9-16; vol. 95, No. 122; Central Research Laboratories, Matsushita Electric Industrial Co. Ltd.; Japan.

Masanobu Nakamura et al.; Analysis of Cepstral Features of Japanese Spontaneous Speech Using Mahalanobis Distance; Tokyo Institute of Technology; Japan.

Kai Ishikawa et al.; A Computer Recovering Its Own Misheard-Guessing the Original Sentence from a Recognition Result Based on Damilliar Expressions, ATR Journal vol. 37, 1999; Japan.

An English translation of the Japanese Office Action of corresponding Japanese Application No. JP 2006-293098, dated Feb. 17, 2011, mailed Feb. 22, 2011.

* cited by examiner

140

PUBLIC OFFICE

| FACILITY ID | FACILITY NAME LABEL | PRONUNCIATION (UTTERED TERM) |
|---|---|---|
| <HOKKAIDO> | | |
| 00001 | HOKKAIDO PREFECTURAL OFFICE | HOKKAIDO PREFECTURAL OFFICE |
| 00002 | SAPPORO CITY MUNICIPAL OFFICE | SAPPORO CITY MUNICIPAL OFFICE |
| <AOMORI PREFECTURE> | | |
| 00123 | AOMORI PREFECTURAL OFFICE | |
| ... | ... | ... |

GOLF COURSE

| FACILITY ID | FACILITY NAME LABEL | PRONUNCIATION (UTTERED TERM) |
|---|---|---|
| <HOKKAIDO> | | |
| 00001 | AAA COUNTRY CLUB | AAA COUNTRY CLUB |
| 00002 | BBB PREMIUM GOLF COURSE | BBB PREMIUM GOLF COURSE |
| ... | ... | ... |

STATION

| FACILITY ID | FACILITY NAME LABEL | PRONUNCIATION (UTTERED TERM) |
|---|---|---|
| <KANAGAWA PREFECTURE> | | |
| 00254 | KAWASAKI STATION | KAWASAKI STATION |
| 00255 | SHIN YOKOHAMA STATION | SHIN YOKOHAMA STATION |
| ... | ... | ... |

AIRPORT

| FACILITY ID | FACILITY NAME LABEL | PRONUNCIATION (UTTERED TERM) |
|---|---|---|
| <AICHI PREFECTURE> | | |
| 000124 | CHUBU INTERNATIONAL AIRPORT | CHUBU INTERNATIONAL AIRPORT |
| ... | ... | ... |

HOTEL

EXHIBITION HALL

FIG. 3

| DIALOG ID | OPERATION ID | SEARCH KEY PREFECTURE NAME | SEARCH KEY MUNICIPALITY | SEARCH KEY FACILITY NAME | MATCH FLAG | DETERMINED FACILITY NAME (MATCH) | CLOSE CANDIDATE COUNT | NAMES OF CANDIDATE FACILITIES (RIGHT, LEFT-RIGHT, AND RIGHT TRUNCATION MATCHES) |
|---|---|---|---|---|---|---|---|---|
| | | DATA (a) | | | DATA (b) | DATA (c) | DATA (d) | |
| ... | ... | ... | ... | ... | ... | ... | ... | ... |
| 00023 | 001 | | | PRINCE HOTEL | 0 | ... | OVER 10 | SAPPORO PRINCE HOTEL SHINAGAWA PRINCE HOTEL MAKUHARI PRINCE HOTEL |
| | 002 | | YOKOHAMA CITY | PRINCE HOTEL | 0 | ... | 2 | YOKOHAMA PRINCE HOTEL SHIN YOKOHAMA PRINCE HOTEL |
| | 999 | | | | 1 | SHIN YOKOHAMA PRINCE HOTEL | | |
| ... | ... | ... | ... | ... | ... | ... | ... | ... |
| 00067 | 001 | | | SENTOREA | 0 | | 0 | NOTHING RELEVANT |
| | 002 | | AIRPORT | CHUBU INTERNATIONAL AIRPORT | 1 | CHUBU INTERNATIONAL AIRPORT | 0 | ... |
| | 999 | | | | 1 | CHUBU INTERNATIONAL AIRPORT | | |
| ... | ... | ... | ... | ... | ... | ... | ... | ... |
| 00102 | 001 | | | TOKYO TOWER | 1 | TOKYO TOWER | 0 | ... |
| | 999 | | | | 1 | TOKYO TOWER | | |
| ... | ... | ... | ... | ... | ... | ... | ... | ... |

- DIALOG (a): 00023 rows
- DIALOG (b): 00067 rows
- DIALOG (c): 00102 rows
- 230

FIG. 5

| FACILITY ID | FACILITY NAME LABEL | UTTERANCE LABEL | FREQUENCY (PAST 30 DAYS) |
|---|---|---|---|
| 000124 | CHUBU INTERNATIONAL AIRPORT | CHUBU AIRPORT | 200 |
| | | CHUBU NEW INTERNATIONAL AIRPORT | 20 |
| | | SENTOREA | 120 |
| .. | .. | .. | .. |
| 000300 | SHIN YOKOHAMA PRINCE HOTEL | PRINCE HOTEL | 3 |
| | | SHIN YOKOHAMA PRINCE HOTEL | 240 |
| | | PRINCE HOTEL SHIN YOKOHAMA | 14 |
| .. | .. | .. | .. |
| 010976 | YOKOHAMA PREMIUM COUNTRY CLUB | YOKOHAMA COUNTRY CLUB | 134 |
| | | YOKOHAMA PREMIUM COUNTRY CLUB | 20 |
| .. | .. | .. | .. |

PUBLIC OFFICE

| FACILITY ID | FACILITY NAME LABEL | PRONUNCIATION (UTTERED TERM) |
|---|---|---|
| <HOKKAIDO> | | |
| 00001 | HOKKAIDO PREFECTURAL OFFICE | HOKKAIDO PREFECTURAL OFFICE |
| 00002 | SAPPORO CITY MUNICIPAL OFFICE | SAPPORO CITY MUNICIPAL OFFICE |
| ... | ... | ... |
| <AOMORI PREFECTURE> | | |
| 00123 | AOMORI PREFECTURAL OFFICE | |

STATION

| FACILITY ID | FACILITY NAME LABEL | PRONUNCIATION (UTTERED TERM) |
|---|---|---|
| <KANAGAWA PREFECTURE> | | |
| 00254 | KAWASAKI STATION | KAWASAKI STATION |
| 00255 | SHIN YOKOHAMA STATION | SHIN YOKOHAMA STATION |
| ... | ... | ... |

GOLF COURSE

| FACILITY ID | FACILITY NAME LABEL | PRONUNCIATION (UTTERED TERM) |
|---|---|---|
| <HOKKAIDO> | | |
| 00001 | AAA COUNTRY CLUB | AAA COUNTRY CLUB |
| 00002 | BBB PREMIUM GOLF COURSE | BBB PREMIUM GOLF COURSE<br>BBB PREMIUM COUNTRY<br>BBB GOLF COURSE |
| ... | ... | ... |

AIRPORT

| FACILITY ID | FACILITY NAME LABEL | PRONUNCIATION (UTTERED TERM) |
|---|---|---|
| <AICHI PREFECTURE> | | |
| 000124 | CHUBU INTERNATIONAL AIRPORT | CHUBU INTERNATIONAL AIRPORT<br>CHUBU AIRPORT<br>SENTOREA<br>~~CHUBU NEW INTERNATIONAL AIRPORT~~ (DELETED) |
| ... | ... | ... |

HOTEL

EXHIBITION HALL

FIG. 12

| | DIALOG ID | USER ATTRIBUTE REGION: HOKKAIDO (A), TOHOKU (B)... AGE GROUP: LATE TEEN (A), EARLY 20s (B)... | OPERATION ID | SEARCH KEY PREFECTURE NAME | SEARCH KEY MUNICIPALITY | SEARCH KEY FACILITY NAME | MATCH FLAG | DETERMINED FACILITY NAME (MATCH) | CLOSE CANDIDATE COUNT | NAMES OF CANDIDATE FACILITIES (RIGHT, LEFT-RIGHT, AND RIGHT TRUNCATION MATCHES) |
|---|---|---|---|---|---|---|---|---|---|---|
| | | | | | | DATA (a) | DATA (b) | DATA (c) | DATA (d) | |
| | ... | ... | ... | ... | ... | ... | ... | ... | ... | ... |
| DIALOG (a) { | 00023 | REGION: SOUTH KANTO (D) AGE GROUP: LATE 20s (C) → USER ATTRIBUTE = DC | 001 | | | PRINCE HOTEL | 0 | ... | OVER 10 | SAPPORO PRINCE HOTEL SHINAGAWA PRINCE HOTEL MAKUHARI PRINCE HOTEL : |
| | | | 002 | | YOKOHAMA CITY | PRINCE HOTEL | 0 | ... | 2 | YOKOHAMA PRINCE HOTEL SHIN YOKOHAMA PRINCE HOTEL |
| | | | 999 | | | | - | SHIN YOKOHAMA PRINCE HOTEL | | |
| | ... | ... | ... | ... | ... | ... | ... | ... | ... | ... |
| DIALOG (b) { | 00067 | BC | 001 | | | SENTOREA | 0 | | 0 | NOTHING RELEVANT |
| | | | 002 | | AIRPORT | CHUBU INTERNATIONAL AIRPORT | 1 | CHUBU INTERNATIONAL AIRPORT | 0 | ... |
| | | | 999 | | | | - | CHUBU INTERNATIONAL AIRPORT | | |
| | ... | ... | ... | ... | ... | ... | ... | ... | ... | ... |
| DIALOG (c) { | 00102 | DE | 001 | | | TOKYO TOWER | 1 | TOKYO TOWER | 0 | ... |
| | | | 999 | | | | - | TOKYO TOWER | | |
| | ... | ... | ... | ... | ... | ... | ... | ... | ... | ... |

230

| Time | Facility ID | Facility Name Label | Utterance Label |
|---|---|---|---|
| 9/20/2005 | 000124 | Chubu International Airport | Sentorea |
| 9/20/2005 | 000300 | Shin Yokohama Prince Hotel | PrinNsuhotaru |
| 9/20/2005 | 010976 | Yokohama Premium Country Club | Yokohamakantori:kurabu |
| : | : | : | : |
| 10/10/2005 | 000124 | Chubu International Airport | Sentorea |
| : | : | : | : |
| 10/22/2005 | 000124 | Chubu International Airport | Tyu:buku:ko |
| 10/22/2005 | 000124 | Chubu International Airport | Sentonia |
| 11/01/2005 | 030245 | Aichikyuhaku Memorial Park | Bampakuko:eN |
| 11/01/2005 | 000124 | Chubu International Airport | Sentoria |
| : | : | : | : |
| 11/01/2005 | 000124 | Chubu International Airport | Sentorea |
| : | : | : | : |

FIG. 15

RECOGNITION DICTIONARY SYSTEM AND RECOGNITION DICTIONARY SYSTEM UPDATING METHOD

CROSS-REFERENCE TO RELATED APPLICATIONS

This application claims priority to Japanese Patent Application No. 2006-002305, filed on Jan. 10, 2006 and Japanese Patent Application No. 2006-293098, filed on Oct. 27, 2006. The entire disclosures of Japanese Patent Application Nos. 2006-002305 and 2006-293098 are hereby incorporated herein by reference.

BACKGROUND OF THE INVENTION

1. Field of the Invention

The present invention relates to a recognition dictionary system and a recognition dictionary system updating method used for, for example, an on-vehicle navigation system.

2. Background Information

In recent years, numerous systems have been offered that conduct speech dialog with a user by speech recognition. In the basic flow of speech dialog, speech is input to a system in order to accomplish a user's objective, and then a response that corresponds to the results of the system's recognition of that speech is presented to the user via speech or a display device. If sufficient information for accomplishing a task (the user's objective) is obtained with a user's single utterance, then a process, such as the operation of a device, is executed based on that information. However, if sufficient information is not obtained, then the system aims to accomplish the task by conducting a dialog, which includes questions and responses as well as the repetition of utterances, until sufficient information is obtained. A representative application of conducting speech dialog with a user is a recognition dictionary system included in a navigation speech recognition system whose main task is the input of a destination facility name into a navigation device.

In a conventional navigation speech recognition system, a user utters a facility name, which constitutes the destination, in accordance with a message that is presented by a display or the speech of the system. The conventional navigation speech recognition system then sets the destination by checking the recognition dictionary for this uttered speech, and outputting the term that is the closest match (the one with the highest recognition score) as the recognition result. This conventional speech recognition method, which sets the term (1-best) included in the recognition results that has the highest recognition score as the recognized term, is the simplest method. The goal of applying speech recognition to more complex tasks or to systems that have a large number of terms has led to the proposal of a technique that re-evaluates the acceptance of a recognized word based on a so-called "confidence measure" (CM). The confidence measure is an index that expresses how easily a term might be mistaken for a rival term. Various methods for representing the confidence measure have been proposed that use, for example, a posterior word probability, an N-best list and a word lattice (F. Wessel, R. Schluter, and H. Ney. "Using Posterior Word Probabilities For Improved Speech Recognition", in *Proceedings of the IEEE ICASSP* 2000, Istanbul, Turkey, June 2000, pp. 1587-1590) (Japanese Laid-Open Patent Application Publication No. 2005-164837).

Furthermore, combining the confidence measure and a dialog strategy makes it possible to implement a task accomplishing method that is based on high-level dialog. With a dialog in which, for example, a destination is set in the navigation speech recognition system discussed above, the user utters the speech, "XX golf course", whereupon the system first attempts a nationwide search for facilities. However, there are cases in which a sufficient confidence measure cannot be obtained because of the large number of rival terms. Accordingly, the system pursues a response strategy that asks for the prefecture name, and then re-executes the search, this time focusing on the term, which was obtained based on the user's input of the prefecture name, and thereby accomplishing the setting of the destination.

In view of the above, it will be apparent to those skilled in the art from this disclosure that there exists a need for an improved recognition dictionary system. This invention addresses this need in the art as well as other needs, which will become apparent to those skilled in the art from this disclosure.

SUMMARY OF THE INVENTION

In the conventional navigation speech recognition system discussed above, a recognition dictionary of a recognition dictionary system registers groups of terms by prefecture name, municipality name, as well as facility category. The destination is set by comparing the uttered speech with the groups of terms registered in the recognition dictionary. However, with the conventional navigation speech recognition system discussed above, if the user utters something that is not a registered term, then problems arise in which, for example, the system cannot correctly recognize the term included in the uttered speech and therefore cannot obtain a recognized term, or the system recognizes the wrong term. For example, in the recognition dictionary that is used in the conventional navigation speech recognition system discussed above, a recognized term is usually determined by using facility name information, which is included in national map data that is provided by a map-making company. The facility name information consists of the formal names reported to the public by each facility operator. Therefore, to correctly recognize the user's utterance, the user must utter the formal name of the facility.

However, actual dialogs are not limited to ones in which the user always utters the facility name correctly. Accordingly, dialogs between telephone operators and users were analyzed, whereupon it was found that approximately 57% of all users could utter the formal name (the facility name registered on a map) of a facility. The remaining percentage of users uttered a facility name that included: (1) a deletion, (2) a substitution, or (3) an insertion, i.e., they uttered a "variant term". The following are three specific examples of "variant terms" uttered instead of the formal name "Chubu International Airport": (1) Deletion: "Chubu Airport" (abbreviation); (2) Substitution: "Sentorea" (nickname, former name, etc.); and (3) Insertion: "Chubu New International Airport" (Other name, etc.).

If such a variant term of a facility name is uttered, then the facility name cannot be correctly recognized and the user must consequently re-input information or correct his or her utterance in order to set the destination. For example, assume the conventional navigation speech recognition system discussed above is used and the user initially utters "Sentorea" (which is a nickname for "Chubu International Airport"), and the variant term "Sentorea" is not registered in the recognition dictionary. In such case, with the conventional speech recognition system that checks the recognition dictionary for the user's uttered speech, and then uses the term that is the closest match, i.e., the term with the highest recognition score (1-best), as the recognition result, a recognition result cannot be obtained. Accordingly, the user must set the destination once again.

On the other hand, with a speech recognition system that uses a confidence measure calculating method and a dialog strategy, there are cases in which a term with a sufficient confidence measure level does not exist and a recognition result therefore cannot be obtained, or wherein the wrong facility is recognized even though a term with a sufficient confidence measure level was detected. In these cases, the user continues with additional dialog and corrects his or her utterances, subsequently uttering, "Chubu International Airport". Then, the destination can be set to the desired facility. Furthermore, if the user does not know the formal name of the facility, then he or she cannot directly utter that facility name. In that case, the user sets the desired destination by, for example, a manual operation and searches the recognition dictionary for the facility name based on, for example, the prefecture name and the facility genre. Consequently, such system is not user friendly.

Accordingly, a navigation speech recognition system, which is provided with a recognition dictionary, that can recognize variant terms is desirable to improve user friendliness. However, as it is conceivable that there are innumerable variant terms for facility names nationwide, it is extremely difficult to cover all such variant terms and to pre-register them in the recognition dictionary based solely on the programmer's knowledge, and thus, variant terms registered in the recognition dictionary in the conventional system are limited to a few famous facilities. Furthermore, it is also extremely difficult to pre-register all variant terms in the recognition dictionary because variant terms change over the years and differ among age groups.

Therefore, one object of the present invention is to provide a recognition dictionary system and a recognition dictionary updating method that can detect a state in which a variant term has occurred, update a recognition dictionary to register the variant term such that the variant term can be recognized by the recognition dictionary system.

In order to achieve the abovementioned object, a recognition dictionary system includes a variant term accumulation unit, a variant frequency analysis unit, and a recognition dictionary update unit. The variant term accumulation unit is configured to accumulate and store a first variant term that has a meaning equivalent to a base term stored in a recognition dictionary and has first character string information that is different from character string information of the base term. The variant frequency analysis unit is configured to analyze an occurrence frequency of the first variant term accumulated and stored in the variant term accumulation unit and to determine the first variant term as a principal variant term when the occurrence frequency is higher than a first prescribed value. The recognition dictionary update unit is configured to update the recognition dictionary to register the principal variant term in the recognition dictionary as being associated with the base term.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a schematic diagram of an example of recognized term data that is stored in a recognition dictionary of the recognition dictionary system in accordance with the first embodiment of the present invention;

FIG. 5 is a schematic diagram of an example of data stored in an operator log storage unit of an operator service system of the recognition dictionary system in accordance with the first embodiment of the present invention;

FIG. 8 is a table showing an example of variant frequency analysis executed by a variant frequency analysis unit of the dictionary updating system of the recognition dictionary system in accordance with the first embodiment of the present invention;

FIG. 11 is a schematic diagram of the recognized term data based on variant terms stored in the recognition dictionary of the recognition dictionary system after updating the recognition dictionary in accordance with the first embodiment of the present invention;

FIG. 12 is a schematic diagram of an example of the data stored in the operator log storage unit in which user attributes are taken into consideration in accordance with the first embodiment of the present invention;

FIG. 15 is a schematic diagram illustrating an example of cumulative variant term data stored in a variant term accumulation unit of a dictionary updating system of the recognition dictionary system in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In accordance with the recognition dictionary system of the present invention, even when unrecognizable variant terms exist, the occurrence of variant terms is detected based on actual usage of the variant terms, and the recognition dictionary is updated in order to register the variant terms detected. Therefore, the variant terms can be appropriately recognized by the recognition dictionary system.

In first through third embodiments of the present invention as described below, the recognition dictionary system is adapted to a navigation speech recognition apparatus in which a destination is set by using the recognition dictionary system. The recognition dictionary system of the present invention is configured and arranged to detect the actual usage of variant terms, which are not registered in a recognition dictionary, uttered by the user, and to update that recognition dictionary in order to register such variant terms therein. Therefore, it will be apparent to those skilled in the art from this disclosure that the same effect of the present invention can be obtained even in a speech recognition apparatus that is adapted to an apparatus other than the navigation speech recognition apparatus.

First Embodiment

Figure 1:
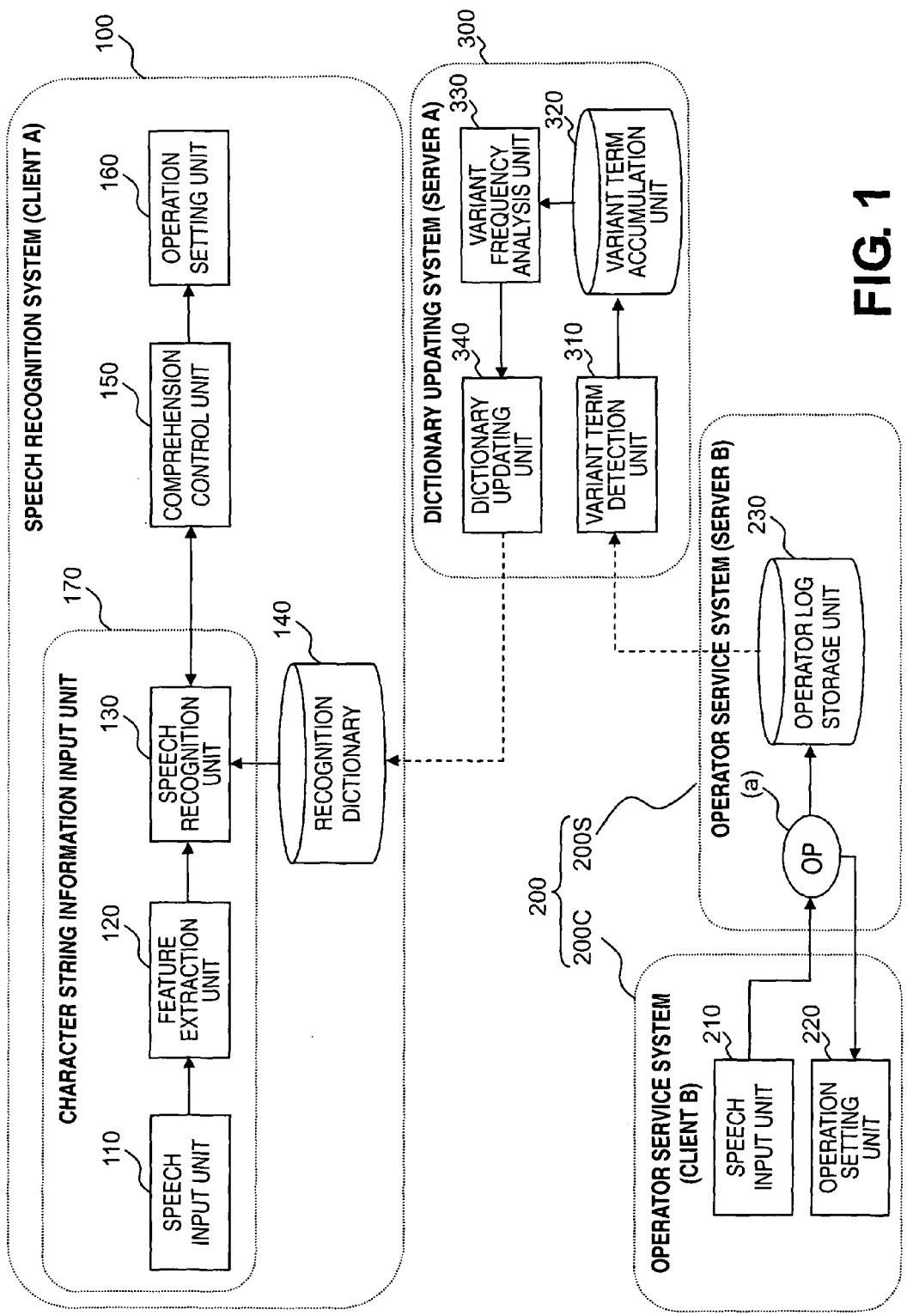
FIG. 1 is an overall block diagram illustrating a recognition dictionary system in accordance with a first embodiment of the present invention.

Referring initially to FIG. 1, the recognition dictionary system is illustrated in accordance with a first embodiment of the present invention. FIG. 1 is an overall block diagram illustrating a recognition dictionary system in accordance with a first embodiment of the present invention.

The recognition dictionary system of the first embodiment is adapted to a navigation speech recognition apparatus that includes a speech recognition system 100 (Client A), an operator service system 200 (Client B and Server B), and a dictionary updating system 300 (Server A).

The speech recognition system 100 includes a recognition dictionary 140, a comprehension control unit 150, an operation setting unit 160 and a character string information input unit 170. The character string information input unit 170 includes a speech input unit 110, a feature extraction unit 120, and a speech recognition unit 130.

The operator service system 200 includes a client terminal 200C (Client B) and an server terminal 200S (Server B). The client terminal 200C includes a speech input unit 210, an operation setting unit 220. The server terminal 200S includes an operator log storage unit 230.

The dictionary updating system 300 includes a variant term detection unit 310, a variant term accumulation unit 320, a variant frequency analysis unit 330, and a dictionary updating unit 340. The dictionary updating unit 340 preferably constitutes a recognition dictionary update unit of the first embodiment.

In the recognition dictionary system in accordance with the first embodiment, cumulative variant term data, in which a large volume of a user's variant terms has been accumulated and stored, is held separately from the recognition dictionary 140. The recognition dictionary 140 is updated by extracting principal variant terms based on an occurrence frequency analysis of the cumulative variant term data performed by the dictionary updating system 300.

More specifically, with the first embodiment of the present invention, operator log (dialog log) data, which results from the task of setting the destination based on the conversation between an operator (a) and a user of the client terminal 200C of the operator service system 200, is used as the source data from which variant terms are extracted, and then accumulated and stored in the dictionary updating system 300. The operator service system 200 is, for example, a telematic service in which a vehicular information communication terminal is used to set the destination by connecting the user to the operator (a) by telephone using a vehicle side communication device 407 (FIG. 2) which is a client terminal, and announcing the destination. Such telematic operator service has become increasingly popular in recent years. With the operator service system 200, the user of the client terminal 200C (Client B) and the user of the speech recognition system 100 (Client A) can be one and the same, or they can be different. When the user of the client terminal 200C and the user of the speech recognition system 100 are the same, the speech input units 110 and 210 and the operation setting units 160 and 220 provided in the client terminal 200C (Client B) and the speech recognition system 100 (Client A), respectively, can be constituted as a single speech input unit and a single operation setting unit. Furthermore, if a sufficiently large amount, e.g., several years' worth, of operator log data from the server terminal 200S of the operator service system 200 is stored in the operator log storage unit 230 in the server terminal 200S, then the operator service system 200 can be omitted in the present invention because the dictionary updating system 300 (Server A) can be constructed using only that stored operator log data.

Figure 2:
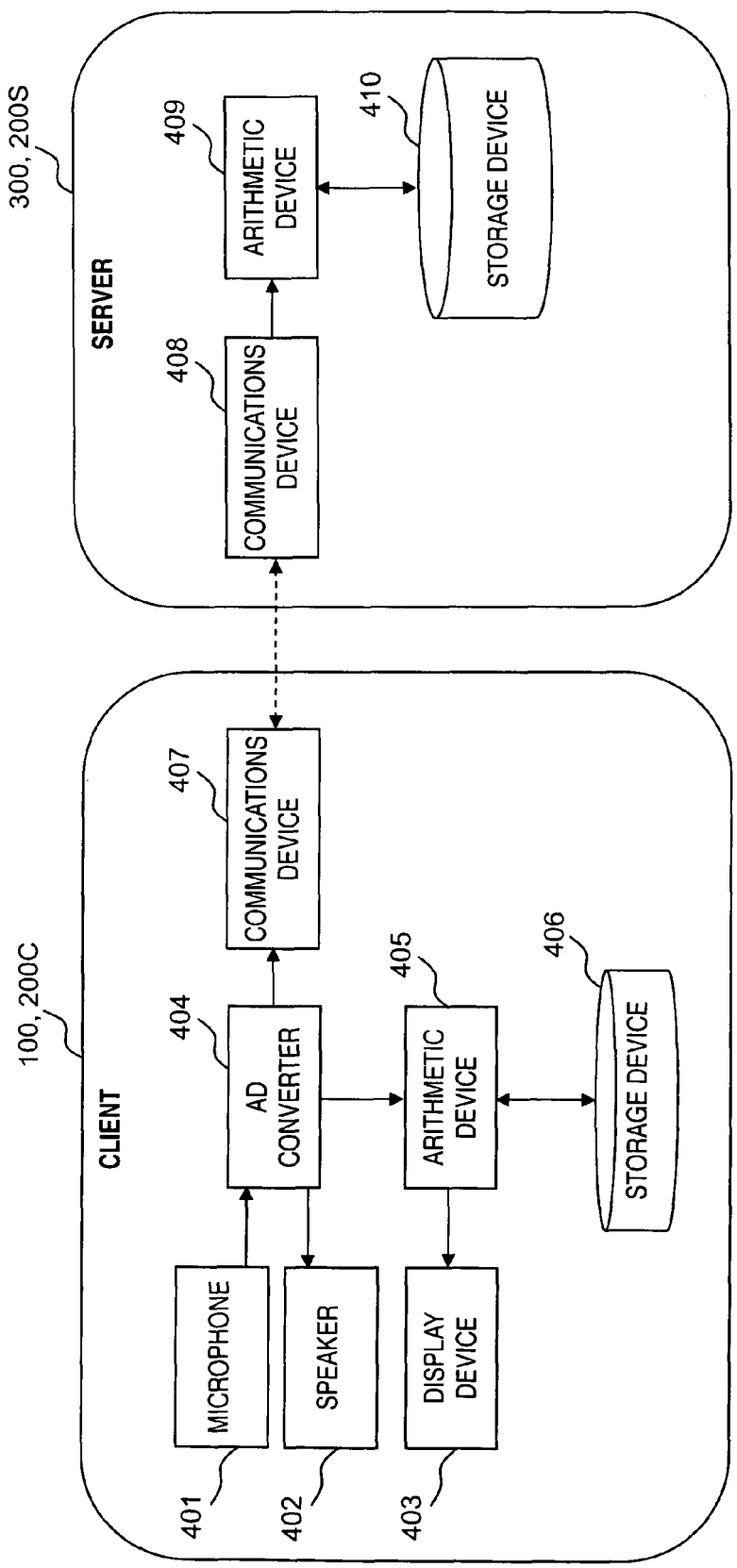
FIG. 2 is a block diagram illustrating an implementation of the recognition dictionary system in accordance with the first embodiment of the present invention.

Referring now to FIGS. 1 and 2, the basic function of each part and the implementation of the recognition dictionary system of first embodiment will now be explained. FIG. 2 is a block diagram illustrating implementations of the speech recognition system 100, the operator service system 200, and the dictionary updating system 300 illustrated in FIG. 1.

As mentioned above, the recognition dictionary system of the first embodiment is adapted to the navigation speech recognition apparatus of a client-server type. The recognition dictionary 140 of the speech recognition system 100 is updated by downloading update data from the dictionary updating system 300 (Server A). In the explanation hereinbelow, all speech recognition processes are accomplished on the speech recognition system 100 (Client A) side, and update data of the recognition dictionary 140 is received from the dictionary updating system 300 (Server A). However, it will be apparent to those skilled in the art from this disclosure that the speech recognition system 100 (Client A) can be configured and arranged so that a speech signal itself or a feature value of uttered speech is sent to the dictionary updating system 300 (Server A) and all speech recognition processes performed from the speech recognition unit 130 onward are performed by the dictionary updating system 300 (Server A). In such case, communication with the dictionary updating system 300 (Server A) is necessary when performing the speech recognition processes. In addition, if the recognition dictionary 140 is updated by, for example, physically shipping a storage medium (such as a CD-ROM) to the user, then it is also possible to arranged the speech recognition system 100 (Client A) as a stand-alone system that does not need to communicate with the dictionary updating system 300.

The speech recognition system 100 (Client A) will now be explained. As discussed above with reference to FIG. 1, the speech recognition system 100 includes the speech input unit 110, the feature extraction unit 120, the speech recognition unit 130, the recognition dictionary 140, the comprehension control unit 150 and the operation setting unit 160. As seen in FIG. 2, the speech recognition system 100 of the first embodiment is implemented by a microphone 401, a speaker 402, a display device 403, an A/D converter 404, an arithmetic device 405, a storage device 406 and a communication device 407.

The speech input unit 110 is configured and arranged to input the user's uttered speech and send the speech signal, which has been converted to a discrete signal, to the feature extraction unit 120. The speech input unit 110 is implemented by, for example, the combination of the microphone 401 and the A/D converter 404.

The feature extraction unit 120 is configured and arranged to extract a feature value, which is used for the speech recognition process, from the speech signal that was converted to a discrete signal by the speech input unit 110. The feature extraction unit 120 is implemented, for example, by the combination of the arithmetic device 405 and the storage device 406. Here, an MFCC (Mel frequency cepstral coefficient) or the like can be used as the feature value. Furthermore, it is preferable to perform a process that suppresses, for example, additive noise and multiplicative noise in the feature value extraction stage to improve the performance of speech recognition that is performed later on. A conventional method of suppressing additive noise such as spectral subtraction (SS), and a conventional method of suppressing multiplicative noise such as cepstral mean normalization (CMN) can be used to suppress additive noise and multiplicative noise.

The speech recognition unit 130 and the recognition dictionary 140 are configured and arranged to check for character string information that corresponds to uttered speech obtained from the feature extraction unit 120. More specifically, the speech recognition unit 130 is configured to evaluate the degree of similarity between the feature value of that uttered speech and each term, which is character string information, registered in the recognition dictionary 140, to compare those similarity degrees, and then to select character string information. Therefore, the speech recognition unit 130 and the recognition dictionary 140 are implemented, for example, by the combination of the arithmetic device 405 and the storage device 406. The speech recognition unit 130 is configured to perform the speech recognition processes by using, for example, a likelihood calculating method that uses the HMM (hidden Markov model). Specifically, the recognition dictionary 140 includes an acoustic model and a language model. The acoustic model used in the recognition dictionary 140 is, for example, a triphone model, and the language model used in the recognition dictionary 140 is, for example, a network language model or a statistical language model.

In the recognition dictionary system of the first embodiment, setting the destination is defined as the main task, and thus, it is preferable to use a network language model that registers the destination, i.e., the facility name, as a recognized term and hierarchically links the registered recognized term data. Furthermore, an update process of the recognition dictionary 140, which is discussed later in the first embodiment, means the updating of the abovementioned language model of the recognition dictionary 140. In addition, if the present invention is adapted to a speech recognition system that combines a dialog strategy and the confidence measure discussed above, then it is necessary for the speech recognition unit 130 to have a confidence measure calculation function.

FIG. 3 is a schematic diagram illustrating an example of recognized term data, i.e., facility data that is stored in the recognition dictionary 140 in an initial state. As shown in FIG. 3, the recognition dictionary 140 is configured to store facility IDs, facility name label data, pronunciation data thereof (actually uttered name data), and corresponding recognized term data (facility data). No variant terms are registered in the recognition dictionary 140 in the initial state, and thus, the facility name label data and the pronunciation data thereof are all stored with a one-to-one relationship. As discussed later, after the dictionary updating unit 340 of the dictionary updating system 300 performs the process of updating the variant terms, a plurality of pronunciation data entries may be registered for a single facility name label data entry.

The comprehension control unit 150 is configured to receive the results of the speech recognition process performed by the speech recognition unit 130, and to evaluate the current comprehension state. In other words, the comprehension control unit 150 is configured to evaluate the extent to which the information needed to set the destination has been acquired. The comprehension control unit 150 is implemented, for example, by the combination of the arithmetic device 405 and the storage device 406. Here, if it is determined that sufficient information has been acquired to set the destination, i.e., if the destination can be uniquely determined from the group of terms, which was obtained from the results of the speech recognition processes up to that point, then the comprehension control unit 150 is configured to permit the operation setting unit 160 to execute a destination setting operation. On the other hand, if it is determined that sufficient information has not been acquired, i.e., if the destination has not been uniquely determined from the group of terms, which was obtained from the results of the speech recognition processes, if a term with a sufficient recognition score (confidence measure) cannot be acquired due to the impact of, for example, noise or the user's pronunciation, or if the user has input a correction or a negation, then the comprehension control unit 150 is configured to prompt the user for additional utterances by generating a corresponding question and response dialog, and sending such to an output unit, i.e., the speaker 402 and/or the display device 403.

If the comprehension control unit 150 determines that the destination has been, uniquely determined, then the operation setting unit 160 is configured to execute the destination setting operation. The operation setting unit 160 is implemented, for example, by the combination of the arithmetic device 405 and the storage device 406. An example of the destination setting operation performed by the operation setting unit 160 is a process that sends a destination name, or an index (input character string information) that corresponds thereto, to a route calculation unit (not shown) of the navigation system. The route calculation unit is configured to receive the result of the destination setting process and to calculate the route from the user's present location.

Next, the operator service system 200 (the client terminal 200C (Client B) and the server terminal 200S (Server B)) will now be explained. The client terminal 200C of the operator service system 200 can be implemented by the microphone 401, the speaker 402, the display device 403, the AD converter 404, the arithmetic device 405, the storage device 406 and the communication device 407. The server terminal 200S (Server B) of the operator service system 200 can be implemented by a communication device 408, an arithmetic device 409 and a storage device 410 as shown in FIG. 2.

The speech input unit 210 of the client terminal 200C is configured to input the user's uttered speech and to send the user's uttered speech to the operator (a) via a telephone line. The speech input unit 210 includes, for example, the microphone 401. Furthermore, the speech input unit 210 includes a speech codec processing unit and a communication unit (not shown) for conducting a telephone conversation with the operator (a). If the destination is determined by a phone conversation with the operator (a), then the operator (a) sends the destination information to the operation setting unit 220 of the client terminal 200C.

The operation setting unit 220 is configured to receive the destination information, which was sent by the operator (a), and to instruct the route calculation unit (not shown) of the navigation system to execute the route calculation. The operation setting unit 220 is implemented, for example, by the combination of the arithmetic device 405 and the storage device 406. The specifics of the destination setting operation are the same as that of the operation setting unit 160 of the speech recognition system 100 discussed above. Furthermore, as discussed above, information is sent from the speech input unit 210 to the operator (a) or from the operator (a) to the operation setting unit 220. Therefore, the client terminal 200C is preferably provided with the communication device 407 and the server terminal 200S is preferably provided with the communication device 408, and the communication devices 407 and 408 are preferably connected by a communications network.

The operator log storage unit 230 is configured to store a log or history of the facility searches performed by the operator (a). The operator log storage unit 230 is implemented, for example, by the storage device 410. The operator (a) comprehends the destination requested by the user based on a dialog with the user, and performs a facility search by sending a search keyword to a search system (not shown), which is provided to the server terminal and has a facility database that is similar to the recognition dictionary 140. Accordingly, the operator service system 200 includes the client terminal 200C, which is the terminal used by the user, and the server terminal 200S, which is connected to at least one client terminal 200C via the communications network. The client terminal 200C includes the speech input unit 210 and the server terminal 200S includes the search system (not shown), which has the facility database that is similar to that of the recognition dictionary 140.

Figure 4:
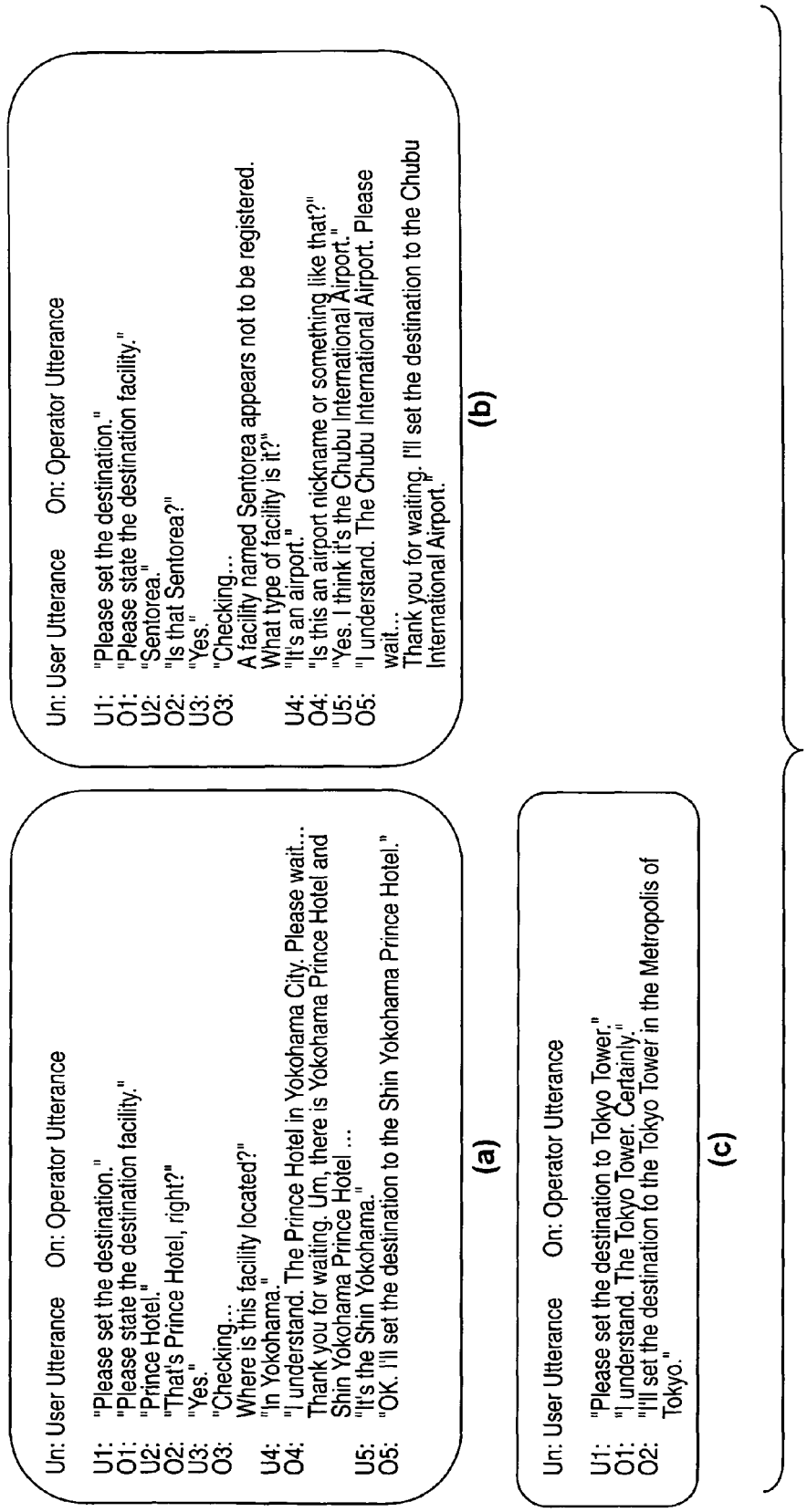
FIG. 4 shows a several examples of dialog between a user and an operator for setting a destination in accordance with the first embodiment of the present invention.

FIG. 4 shows examples of dialogs conducted between the user and the operator (a) for the case in which the user uses the operator service system 200 to set a destination. FIG. 5 shows an example of an operator log stored in the operator log storage unit 230 after the dialogs shown in FIG. 4 have taken place. As shown in FIG. 5, the operator log includes dialog IDs, operation IDs, prefecture names, municipality names, and facility names. The dialog IDs are assigned for each individual dialog. The operation IDs are assigned for each search conducted based on the user's utterance or for each destination setting operation. The prefecture names, municipality names, and facility names all function as the search keys. Furthermore, the operator log also includes match flags, determined facility names, close candidate counts, and candidate facility names. The match flags indicate whether there was a perfectly matching facility name when a search was conducted using an abovementioned search key. The determined facility names are the perfectly matched facility names. The close candidate counts indicate the number of facility candidates for right truncation matches, left-right truncation matches, and left truncation matches when a perfectly matched facility name does not exist. The candidate facility names list the facility names that correspond to those close candidates.

The dialog shown in a diagram (a) of FIG. 4 took place between the user and the operator (a) in order to set the Shin Yokohama Prince Hotel as the destination. Based on the user's desired destination "Prince Hotel" (the user utterance U2 in the diagram (a) of FIG. 4), the operator (a) performs a search using "Prince Hotel" as the search key (dialog ID=00023, operation ID=001 in FIG. 5). But the operator (a) finds that a perfectly matching candidate does not exist. Because the number of relevant close candidates "XX Prince Hotel" exceeds ten, an inquiry is made regarding the location (the operator utterance O3 in the diagram (a) of FIG. 4). Since an answer of Yokohama City is obtained from the user (the user utterance U4 in the diagram (a) of FIG. 4), a search is conducted again with "Yokohama City" (municipality) as the search key (dialog ID=00023, operation ID=002 in FIG. 5). Then the user is presented with two relevant entries (the operator utterance O4 in the diagram (a) of FIG. 4). An answer of "Shin Yokohama" is obtained from the user (the user utterance U5 in the diagram (a) of FIG. 4), and thereby the destination is finally set to Shin Yokohama Prince Hotel (the operator utterance O5 in the diagram (a) of FIG. 4, dialog ID=00023, operation ID=999 in FIG. 5). In the operator log in FIG. 5, a fixed operation ID of 999 is set when the destination is finally determined.

Moreover, in the dialog shown in a diagram (b) of FIG. 4, a search is attempted (dialog ID=00067, operation ID=001 in FIG. 5) based on the user's desired destination "Sentorea" (the user utterance U2 in the diagram (b) of FIG. 4). The Sentorea or Centrair is used as a nickname of the Chubu International Airport. Since the Sentorea is not an official name of the Chubu International Airport in Japanese, neither a perfect match nor a close candidate exists. Accordingly, the user is presented with return questions (the operator utterances O3 and O4 in the diagram (b) of FIG. 4) and the facility name of "Chubu International Airport" is then obtained from the user. A search is then conducted with the facility name "Chubu International Airport" (dialog ID=00067, operation ID=002 in FIG. 5). Then, a perfectly matched facility is confirmed and set as the destination (dialog ID=00067, operation ID=999 in FIG. 5).

Furthermore, the operator log explained herein tracks the search method that is executed by the search system provided on the operator (a) side. With the first embodiment, if a perfectly matched facility does not exist, then it is assumed that the search system extracts the right truncation matched, left-right truncation matched, and left truncation matched facility names for the term that includes the entire text of the search key, and uses those matches as close candidates. In other words, if "Sentorea" is set as the search key, then a facility name is not extracted unless it is, for example, "XX Sentorea" (left truncation matched), "XX Sentorea XX" (left-right truncation matched), or "Sentorea XX" (right truncation matched). Alternatively, the search system used in the operator service system 200 may be arranged so that if, for example, a perfectly matched facility is not found, then a search is automatically conducted on "Sento", wherein the characters of the suffix are deleted, and facilities such as "Sentoraru XX" are extracted as candidates. In such case, the results of the search for close candidates are also stored in the operator log.

Furthermore, the dialog shown in a diagram (c) in FIG. 4 is an example wherein the setting of the destination "Tokyo Tower" is completed without a return question. In FIG. 5, the operator log for the dialog shown in the diagram (c) in FIG. 4 is stored as dialog ID=00102.

Next, the dictionary updating system 300 (Server A) will now be explained. As mentioned above, the dictionary updating system 300 (Server A) includes the variant term detection unit 310, the variant term accumulation unit 320, the variant frequency analysis unit 330 and the dictionary updating unit 340 as shown in FIG. 1. The dictionary updating system 300 (Server A) can be implemented by the communication device 408, the arithmetic device 409 and the storage device 410 as shown in FIG. 2.

The variant term detection unit 310 and the variant term accumulation unit 320 are configured and arranged to review the operator log (FIG. 5) stored in the operator log storage unit 230, to detect the occurrences of variant terms for facility names, and to accumulate and store the variant terms. The variant term detection unit 310 and the variant term accumulation unit 320 can be implemented, for example, by the combination of the arithmetic device 409 and the storage device 410.

Figure 6:
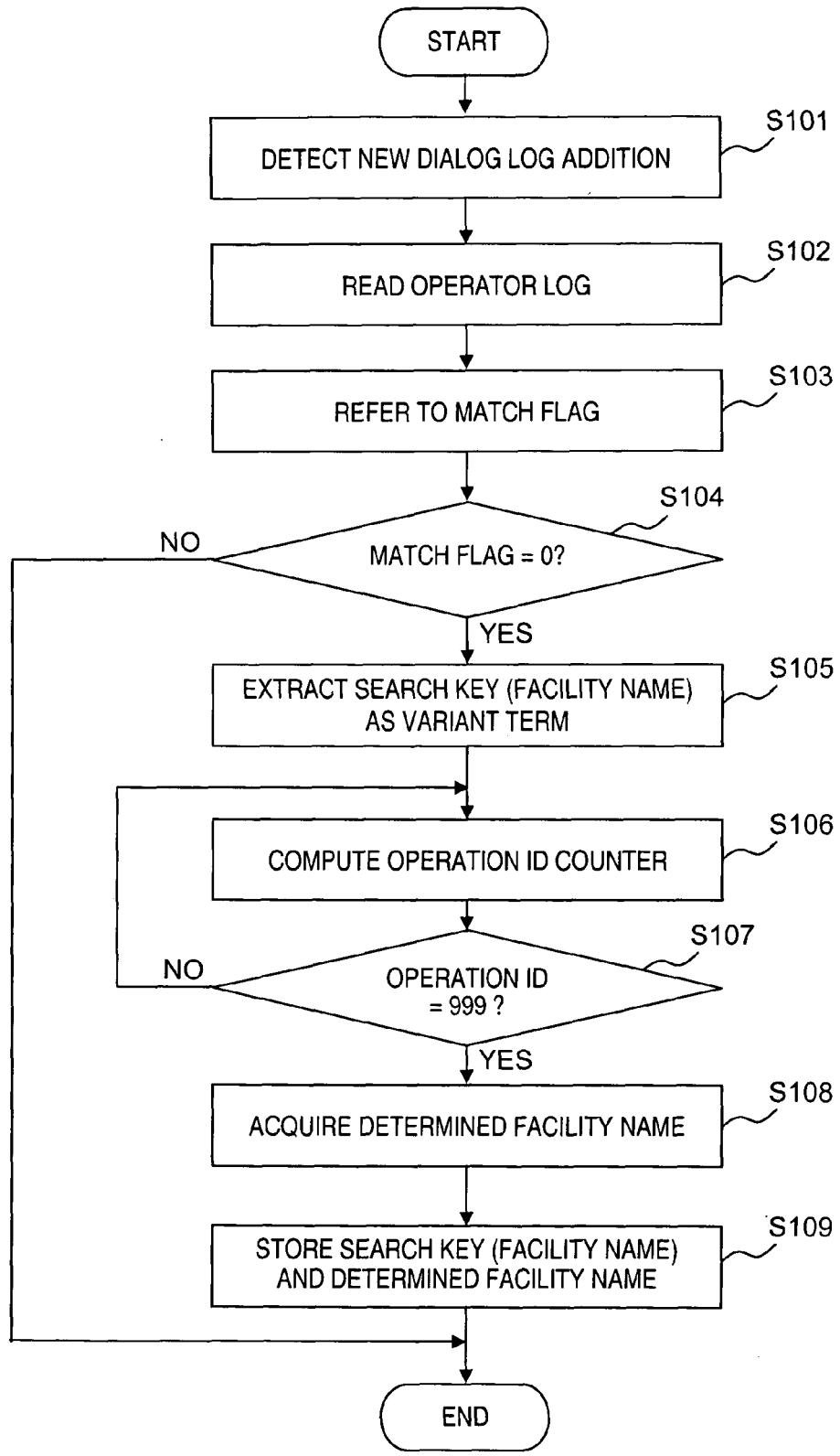
FIG. 6 is a flowchart illustrating a variant term detecting process executed in a variant term detection unit of a dictionary updating system of the recognition dictionary system in accordance with the first embodiment of the present invention.

Referring now to FIG. 6, an example of a method of detecting a variant term executed by the variant term detection unit 310 will be explained.

In step S101, the variant term detection unit 310 is configured to detect the addition (presence of storage of a new dialog) of an operator log (dialog log) data entry discussed above. In step S102, the variant term detection unit 310 is configured to read in the operator log data entry detected in step S101. Then, in step S103, the variant term detection unit 310 is configured to refer to the match flag (data (b) in FIG. 5) in the operator log data entry. In step S104, the variant term detection unit 310 is configured to determine whether a facility name that perfectly matches the search key (facility name) (data (a) in FIG. 5) exists based on a value of the match flag. If the value of the match flag is 1 (No in step S104), then the operator log data entry is for a case wherein a perfectly matched facility name was found. Therefore, the control process ends with respect to the current operator log data entry and the variant term detection unit 310 is configured to repeat the process shown in the flowchart of FIG. 6 with respect to the next dialog. If the value of the match flag is 0 (Yes in step S104), then in step S105, the variant term detection unit 310 is configured to extract the search key (facility name) (data (a) in FIG. 5) (first variant term) included in the user's uttered speech of the operator log data entry as a candidate for a variant term. The variant term is a term that has a meaning that is equivalent to a determined facility name (base term) stored in the recognition dictionary 140 and has a different facility name (character string information). Next, in steps S106 and S107, the variant term detection unit 310 is configured to search a search an operator log data entry for the operation ID of 999. Then, the operation ID of 999 is found, in step S108, the variant term detection unit 310 is configured to acquire the determined facility name (data (c) in FIG. 5), which is stored in the operator log data entry where the operation ID is 999, as the formal or official name of the variant term extracted in step S105. The determined facility name (base term) acquired in step S108 and the variant term (first variant term) acquired in step S105 form a set or pair, which is accumulated and stored in the variant term accumulation unit 320 in step S109. In other words, if the search key (facility name) (first variant term) is a variant term of the determined facility name (base term), then the variant term accumulation unit 320 is configured to accumulate and store cumulative variant term data, which is the information that associates a search key (facility name) (first variant term) and a determined facility name (base term).

Figure 7:
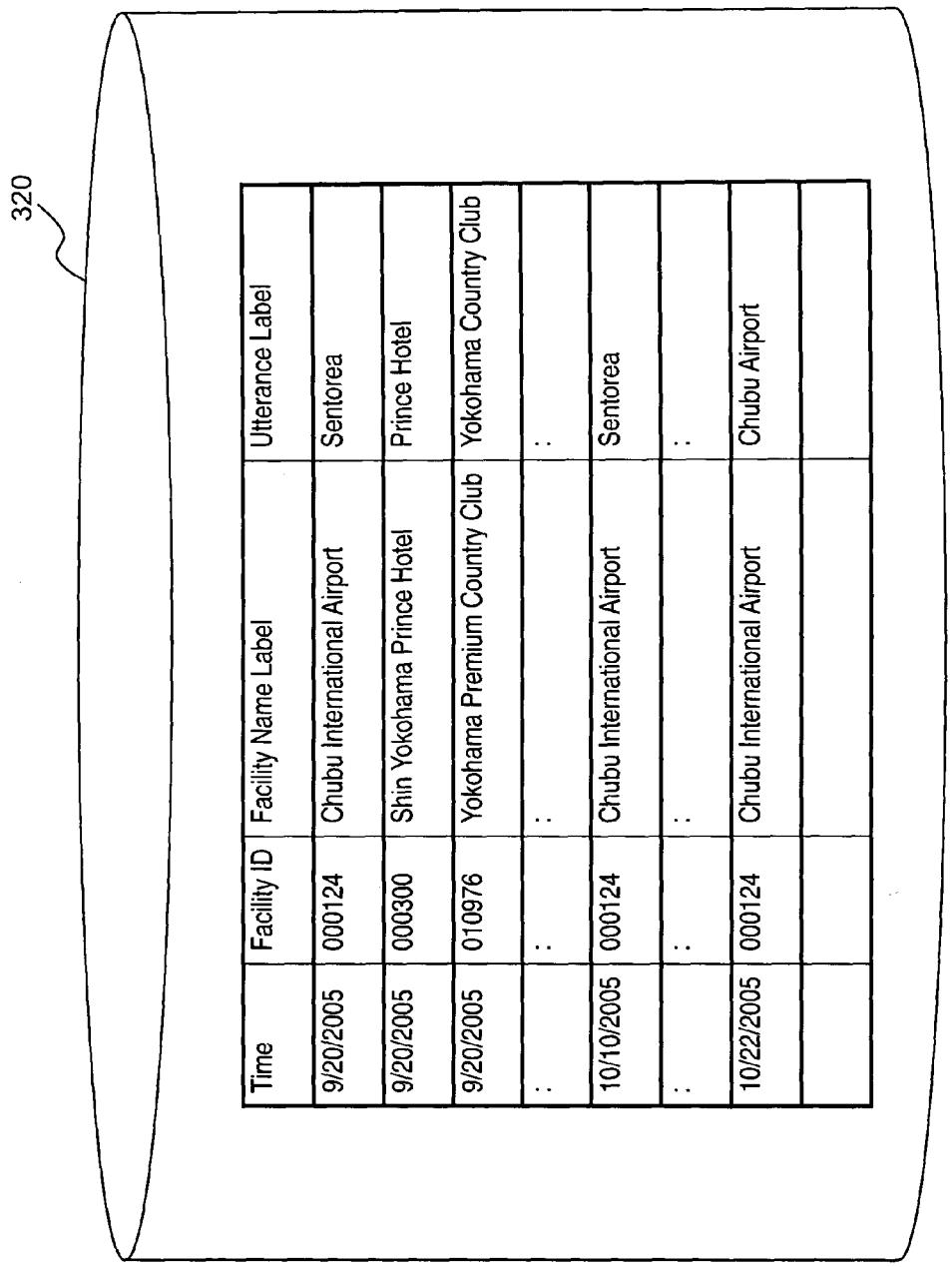
FIG. 7 is a schematic diagram illustrating an example of data stored in a variant term accumulation unit of the dictionary updating system of the recognition dictionary system in accordance with the first embodiment of the present invention.

The variant term detecting method according to the flow-chart of FIG. 6 is configured to detect every instance that a new operator log data is added to accumulate the cumulative variant term data as shown in FIG. 7 in the variant term accumulation unit 320. As shown in FIG. 7, a timestamp of the dialog (the date when the dialog occurred), the formal name of the facility (as a facility name label), and the corresponding variant term (as an utterance label) are recorded in the cumulative variant term data. In addition, a facility ID that corresponds to the facility name label is assigned. The variant term detection unit 310 of the first embodiment is configured and arranged so that the search key (facility name) is always extracted when a perfectly matched facility name cannot be obtained (i.e., when the value of the match flag is 0). Alternatively, the variant term detection unit 310 of first embodiment may be configured and arranged so that only the search key with the close candidate count being less than a prescribed number (e.g., 30 locations) is extracted in consideration of the number of close candidates (data (d) in FIG. 5) when a perfectly matched facility name cannot be obtained. Therefore, it is possible to extract variant terms that omit terms with a very high post-recognition close candidate count, i.e., terms for which there is a possibility that the operation of narrowing down the facility by subsequent dialog will become complicated.

The variant frequency analysis unit 330 of the dictionary updating system 300 is configured and arranged to periodically examine the cumulative variant term data stored in the variant term accumulation unit 320, and to tabulate the frequency at which a variant term occurs for a given formal facility name. The variant frequency analysis unit 330 can be implemented, for example, by the combination of the arithmetic device 409 and the storage device 410 shown in FIG. 2. Furthermore, the variant frequency analysis unit 330 is configured to perform the occurrence frequency analysis process at prescribed time intervals (e.g., every month). Alternatively, the variant frequency analysis unit 330 may be configured and arranged so that the occurrence frequency analysis process is performed when the difference in the data amounts between the cumulative variant term data currently stored in the variant term accumulation unit 320 and the cumulative variant term data from the previous analysis reaches a prescribed amount. In the occurrence frequency analysis process, the variant frequency analysis unit 330 is configured to extract data for each formal facility name and to compute the occurrence frequency of the variant terms that corresponds to that facility name.

Figure 9:
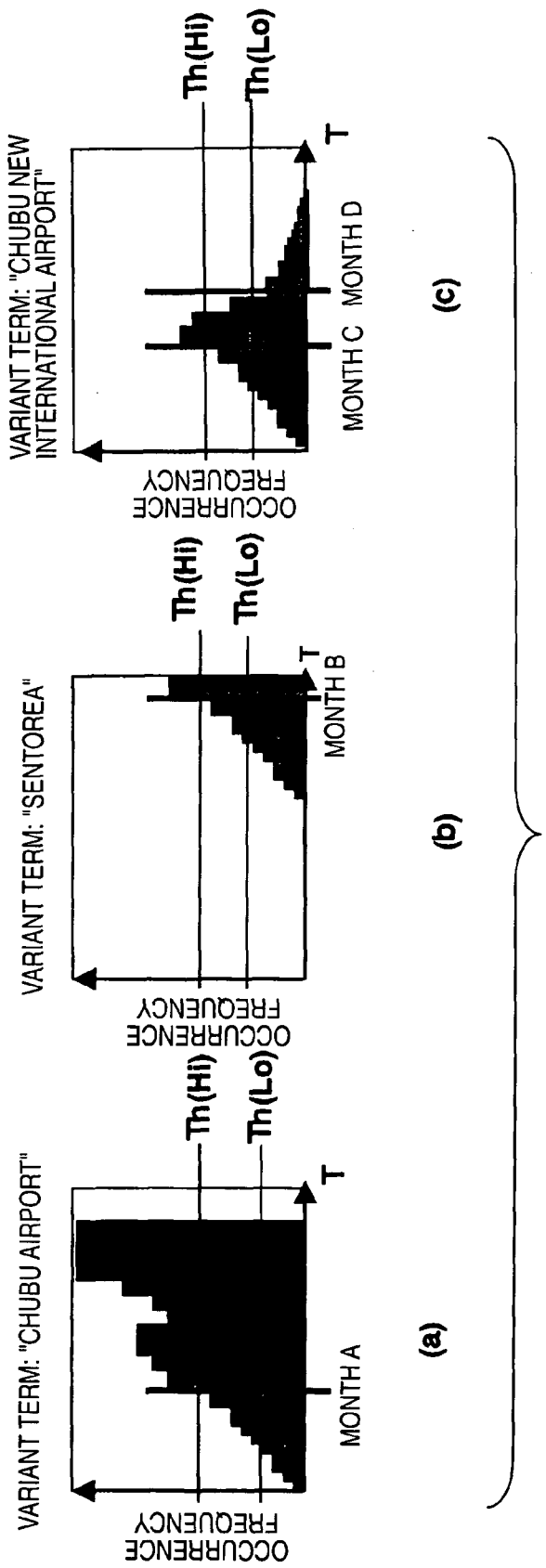
FIG. 9 is a series of charts illustrating results of a time series analysis of the variant frequency executed by a variant frequency analysis unit of the dictionary updating system of the recognition dictionary system in accordance with the first embodiment of the present invention.

FIG. 8 is a table showing an example of variant frequency analysis executed by the variant frequency analysis unit 330. For each facility name (facility name label), the corresponding variant terms (utterance labels) are stored. Furthermore, the occurrence frequency of each corresponding variant term (utterance label) over the past month is computed by counting the occurrences. FIG. 9 are a series of graphs illustrating the time series analysis of the monthly occurrence frequency information. FIG. 9 shows the occurrence frequencies for the variant terms "Chubu Airport" (diagram (a)), "Sentorea" (diagram (b)), and "Chubu New International Airport" (diagram (c)) that correspond to the formal facility name "Chubu International Airport". In each of the diagrams (a) to (c), the vertical axis represents the occurrence frequency, and the horizontal axis represents the time series (by month). After the occurrence frequency analysis process is complete as shown in FIGS. 8 and 9, the variant frequency analysis unit 330 is configured to extract common variant terms that are uttered by many users, i.e., principal variant terms. A principal variant term is a variant term for which the occurrence frequency exceeds a prescribed threshold Th(Hi) (first prescribed value). However, because it is also conceivable that the occurrence frequency may be specific to a period of time, it is preferable to monitor the occurrence frequency at the abovementioned prescribed time intervals, and to delete the variant term from the recognition dictionary 140 if the occurrence frequency should fall below a prescribed threshold Th(Lo) (second prescribed value). In addition, in the case of a rarely uttered facility (e.g., a facility which is rarely set as a destination), there is a possibility that the pace at which occurrences of the variant term accumulate will be slow. Accordingly, it is preferable to adjust the interval at which the occurrence frequency is analyzed from monthly to, for example, semi-annual basis in accordance with the rate of accumulation. Accordingly, the principal variant terms even for rarely uttered facility names may be extracted from the results of accumulating variant terms over a long period of time.

As shown in the example of FIG. 9, the variant frequency analysis unit 330 is set the threshold Th(Hi) (first prescribed value) for registering principal variant terms, and the threshold Th(Lo) (second prescribed value) for deleting variant terms that were set as principal variant terms and registered in the recognition dictionary 140 in the past. As shown in the diagram (a) of FIG. 9, the variant term "Chubu Airport" exceeds the threshold Th(Hi) from month A onward, and is consequently set as a principal variant term and registered in the recognition dictionary 140 by the dictionary updating unit 340. Likewise, as shown in the diagram (b) of FIG. 9, the variant term "Sentorea" is set as a principal variant term starting in month B, and is registered in the recognition dictionary 140 by the dictionary updating unit 340. On the other hand, the variant term "Chubu New International Airport" in the diagram (c) of FIG. 9 exceeds the threshold Th(Hi) in month C, and therefore is set as a principal variant term and registered in the recognition dictionary 140 by the dictionary updating unit 340, but then falls below the threshold Th(Lo) in month D. Consequently, the variant term "Chubu New International Airport" becomes subject to deletion from the recognition dictionary 140 in month D. In other words, the variant term "Chubu New International Airport" is set as a principal variant term and registered in the recognition dictionary 140 by the dictionary updating unit 340 only from month C to month D. As explained above, the variant frequency analysis process is accomplished by a method wherein principal variant terms are extracted by comparing the direct occurrence frequencies (counts). However, the variant frequency analysis may also be accomplished by a method wherein, if a plurality of variant terms occurs for a given formal facility name and is accumulated, then the occurrence percentages among that plurality of variant terms are analyzed, and a variant term is set as a principal variant term if its occurrence percentage exceeds 50%.

Figure 10:
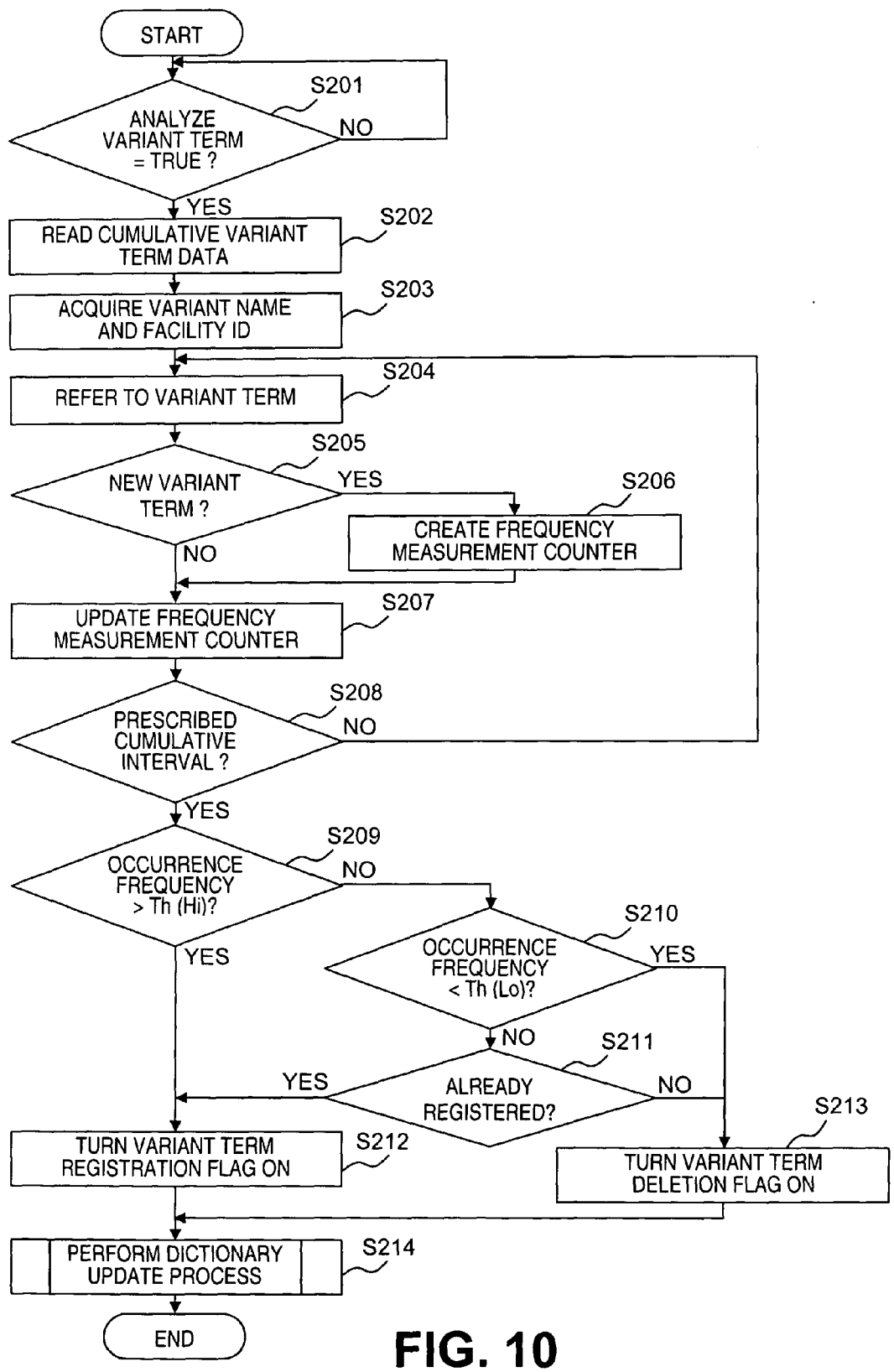
FIG. 10 is a flowchart illustrating a recognition dictionary updating process executed in the recognition dictionary system in accordance with the first embodiment of the present invention.

Referring now to a flowchart of FIG. 10, the frequency analysis process executed by the variant frequency analysis unit 330 and the dictionary updating process executed by the dictionary updating unit 340 will now be explained in accordance with the first embodiment.

In step S201, the variant frequency analysis unit 330 is configured to detect whether there is a command to perform analysis of variant terms. The variant frequency analysis unit 330 is configured to perform the detection in step S201 by, for example, providing a timer with a trigger that is set to a prescribed interval. Next, in step S202, the variant frequency analysis unit 330 is configured read the cumulative variant term data from the variant term accumulation unit 320 by referencing the timestamps and examining the data in sort order from newest to oldest data. Next, in step S203, the variant frequency analysis unit 330 is configured to acquire the facility name (formal facility name in the facility database) and the corresponding facility ID from the cumulative variant term data. In step S204, the variant frequency analysis unit 330 is configured to refer to a variant term that corresponds to the acquired facility name from the cumulative variant term data. In step S205, the variant frequency analysis unit 330 is configured to detect whether the variant term referenced in step S204 is a new variant term. If the variant term obtained in step S204 is a new variant term (Yes in step S205), then the variant frequency analysis unit 330 is configured to create a frequency measurement counter for the new variant term in step S206. However, if the variant term obtained in step S204 is not a new variant term (No in step S205), then the frequency measurement counter has already been created previously, and the variant frequency analysis unit 330 proceeds to step S207.

Next, in step S207, the variant frequency analysis unit 330 is configured to compute (increment) the frequency measurement counter of the variant term obtained in step S204. In step S208, the variant frequency analysis unit 330 is configured to compare the present time with the timestamp of the data acquired in steps S203 and S204, and to determine whether the prescribed time interval (e.g., one month before the present time) has reached. If the prescribed time interval has not reached (No in step S208), the variant frequency analysis unit 330 is configured to repeat the control process of steps S204 to S207 to examine all the past data within the prescribed time interval. If the prescribed time interval has reached (Yes in step S208), then the variant frequency analysis unit 330 is configured to determine whether the occurrence frequency of the variant term exceeds the registration threshold Th(Hi) in step S209. If the occurrence frequency of the variant term exceeds the registration threshold Th(Hi) (Yes in step S209), then the variant frequency analysis unit 330 proceeds to step S212. However, if the occurrence frequency of the variant term falls below the registration threshold Th(Hi) (No in step S209), then the variant frequency analysis unit 330 is further configured to determine whether the occurrence frequency of the variant term falls below the deletion threshold Th(Lo) in step S210. If the occurrence frequency of the variant term falls below the deletion threshold Th(Lo) (Yes in step S210), then the variant frequency analysis unit 330 proceeds to step S213. However, if the occurrence frequency of the variant term exceeds the deletion threshold Th(Lo) (No in step S210), then the variant frequency analysis unit 330 is configured to determine whether the target variant term is already registered in the recognition dictionary 140 in step S211. If the target variant term is already registered in the recognition dictionary 140 (Yes in step S211), then the variant frequency analysis unit 330 proceeds to step S212. However, if the target variant term is not yet registered in the recognition dictionary 140 (No in step S211), then the variant frequency analysis unit 330 proceeds to step S213.

In step S212, if the occurrence frequency of the variant term exceeds the registration threshold Th(Hi) (Yes in step S209), or the variant term is already registered in the recognition dictionary 140 as a principal variant term and is a term for which the occurrence frequency falls within the range between the registration threshold Th(Hi) and the deletion threshold Th(Lo) (No in step S209, No in step S210 and Yes in step S211), then the variant frequency analysis unit 330 is configured to turn a variant term registration flag on. In step S213, if the variant term is not yet registered as a principal variant term in the recognition dictionary 140 and has not reached the registration threshold Th(Hi) (No in step S209 and Yes in step S210), or if the variant term is already registered and has fallen below the deletion threshold Th(Lo) (No in step S209, No in step S210 and No in step S211), then the variant frequency analysis unit 330 is configured to turn a variant term deletion flag on.

Next, in step S214, the dictionary updating unit 340 is configured to refer to the variant term registration flag or the variant term deletion flag assigned to the variant term in step S212 or S213, and to execute a dictionary update process. More specifically, each variant term (principal variant term) that is assigned the variant term registration flag is registered in the recognition dictionary 140, and each variant term (deletion target variant term) that is assigned the variant term deletion flag is deleted from the recognition dictionary 140. Furthermore, if the variant term is already registered and is assigned the variant term registration flag, or if it is not yet registered and is assigned the variant term deletion flag, then substantially no change to the recognition dictionary 140 occurs. Accordingly, if the variant frequency analysis unit 330 is configured to analyze the occurrence frequency of a variant term by referring to the cumulative variant term data stored in the variant term accumulation unit 320. If the occurrence frequency exceeds the threshold Th(Hi), then the variant frequency analysis unit 330 is configured to determine that the variant term is a principal variant term and the dictionary updating unit 340 is configured to register the variant term in the recognition dictionary 140. If the occurrence frequency of the variant term that is already included in the recognition dictionary 140 falls below the threshold Th(Lo), then the variant frequency analysis unit 330 is configured to determine (set) the variant term to be a deletion target variant term (i.e., variant term to be deleted) and the dictionary updating unit 340 is configured to delete that variant term from the recognition dictionary 140.

FIG. 11 is a schematic diagram illustrating the contents of the recognition dictionary 140 that has been updated by the dictionary update process from the initial state shown in FIG. 3. More specifically, FIG. 11 shows some examples of the recognized term data entries (after the recognition dictionary 140 was updated with the variant terms) that are stored in the recognition dictionary 140. The portions enclosed by squares are the variant terms that were added as a result of the dictionary update process. In addition, the variant term that was once registered as the principle variant term and has been subsequently deleted ("Chubu New International Airport", which is in the airport category, in the example in FIG. 11) is shown by double strikethrough lines. Accordingly, if a search key (facility name) (first variant term) included in an operator log data entry (which is equal to the user's utterance speech) has a meaning that is equivalent to a determined facility name (base term) stored in the recognition dictionary 140 and has different character string information, then the dictionary updating unit 340 is configured to determine the search key (facility name) (first variant term) as a variant term of a determined facility name (base term), and updates the recognition dictionary 140 in order to register the search key (facility name) (first variant term) in the recognition dictionary 140 so that it is associated with the determined facility name (base term).

The sequence of the process discussed above makes it possible to detect, accumulate, store, and analyze a variant term of a facility name based on dialog between the user and the operator (a) for setting a destination, and to update the recognition dictionary 140 so as to reflect information. Consequently, it is possible to provide a recognition dictionary 140 that reflects "nicknames" and "abbreviations" that are often uttered by a majority of users. Therefore, the speech recognition system 100 (Client A) can recognize the variant terms uttered by the user, which makes it possible to improve recognition performance. Accordingly, user friendliness of the system is significantly improved. Furthermore, it is possible to shorten the time needed to accomplish a task, such as setting a destination. In addition, with the recognition dictionary system of the first embodiment, a term that has a meaning that is equivalent to a term stored in the recognition dictionary 140 but has different character string information (namely a term that has the same meaning, but a different sound), i.e., a variant term, can be accumulated and stored, and its occurrence frequency can be reliably analyzed. In addition, even if there exists an unrecognizable variant term with the recognition dictionary 140 in the initial state, the variant term can be registered in the recognition dictionary 140 based on actual usage. In addition, because the speech recognition system 100 (Client A) and the dictionary updating system 300 (Server A) are connected via the communication devices 407 and 408, if the variant frequency analysis unit 330 of the dictionary updating system 300 newly sets a principal variant term to be registered in the recognition dictionary 140, the dictionary updating unit 340 can update the recognition dictionary 140 as needed. Furthermore, if the occurrence frequency of the principal variant term that is registered in the recognition dictionary 140 decreases, then that principal variant term is deleted. Therefore, even if a variant term has transformed over time, the recognition dictionary 140 can be updated to appropriately reflect such transformation. Accordingly, it is also possible to expect the effect of suppressing a decline in recognition performance due to the registration of an inappropriate variant term in the recognition dictionary 140.

In addition, there are minor variant terms among the variant terms. Moreover, the cumulative variant term data may include "wrong variant terms" due to, for example, input mistakes or mishearing by the operator (a). However, with the method according to the first embodiment, the occurrence frequency analysis process is performed on information that includes the minor variant terms and the wrong variant terms, and, as a result, the recognition dictionary 140 is updated with attention to just those variant terms that occur with high frequency. Consequently, it is possible to exclude the anomalistic variant terms (such as the minor variant terms and the wrong variant terms), and it is therefore also possible to expect the effect of suppressing a decline in recognition performance caused by the registration of inappropriate terms in the recognition dictionary 140.

In the recognition dictionary system in accordance with the first embodiment explained above, the user attributes such as an age group of a residential area of the user is not particularly concerned. However, there is a strong possibility that, for example, the "nicknames", "other names", and "former names" will vary by a user's region or age group. In order to deal with this possibility, the user attributes which are categorized by, for example, residential area or age group, are assigned at the stage where the operator log is stored, as shown in, for example, FIG. 12. FIG. 12 shows an example of the addition of user attributes to the example of the operator log data stored in the operator log storage unit 230 shown in FIG. 5. More specifically, the variant term accumulation unit 320 is configured to associate, accumulate, and store the determined facility names (base terms) and user attribute information, which comprises at least one of the user's residential area, age group, family composition, and vehicle attribute. The variant frequency analysis unit 330 is then configured to analyze the occurrence frequency of variant terms by user attribute information, and also to determine the principal variant terms by user attribute information. The dictionary updating unit 340 is configure to register the principal variant terms in the recognition dictionary 140 of the speech recognition system 100 that is used by the user to whom the corresponding user attribute information belongs. Thus, the recognition dictionary system of the first embodiment is configured and arranged so that the variant frequency analysis unit 330 performs the occurrence frequency analysis process by user attribute, then, even if there are variant terms that stand out for a specific region or age group, the recognition dictionary 140 can be provided that appropriately reflects such variant terms for the user who belongs to the specific region or age group. Accordingly, it is possible to appropriately set variant terms that vary by generation or region as principal variant terms, and thereby to register variant terms in the recognition dictionary 140 that are suited to the user.

Second Embodiment

Referring now to FIGS. 13 to 18, a recognition dictionary system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The recognition dictionary system of the first embodiment discussed above is configured and arranged to extract the principal variant terms based on dialogs conducted in a system other than the speech recognition system 100 (Client A), such as the dialogs conducted in the operator service system 200, and the extracted principal variant terms are reflected in the recognition dictionary 140. In contrast, in the recognition dictionary system of the second embodiment, a speech recognition system 100' (Client) itself is configured and arranged to detect the occurrence of variant terms, and the variant terms detected by the speech recognition system 100' is accumulated and stored in a dictionary updating system 300' (Server) so that the variant terms are reflected in the recognition dictionary 140.

Figure 13:
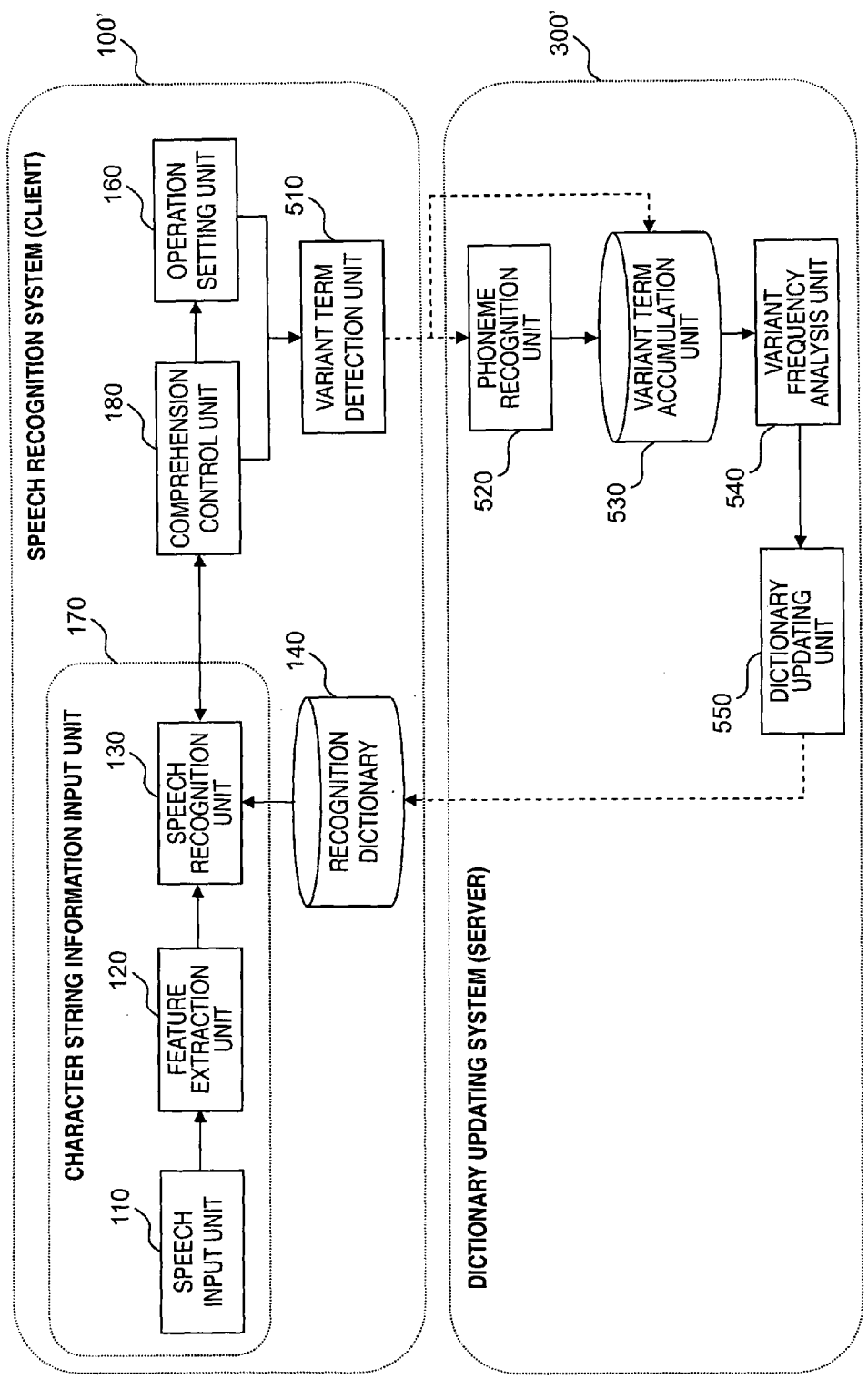
FIG. 13 is an overall block diagram illustrating a recognition dictionary system in accordance with a second embodiment of the present invention.

FIG. 13 is an overall block diagram illustrating the recognition dictionary system in accordance with the second embodiment of the present invention. The recognition dictionary system of the second embodiment is adapted to a navigation speech recognition apparatus that includes the speech recognition system 100' (Client) and the dictionary updating system 300' (Server).

The speech recognition system 100' includes the recognition dictionary 140, the operation setting unit 160, the character string information input unit 170, a comprehension control unit 180 and a variant term detection unit 510. The character string information input unit 170 further includes the speech input unit 110, the feature extraction unit 120, and the speech recognition unit 130.

The dictionary updating system 300' (Server) includes a phoneme recognition unit 520, a variant term accumulation unit 530, a variant frequency analysis unit 540, and a dictionary updating unit 550. The dictionary updating unit 550 preferably constitutes the recognition dictionary update unit of the present invention.

As shown in FIGS. 1 and 13, the recognition dictionary systems of the second embodiment and the first embodiment have a common basic constitution, but the second embodiment differs from the first embodiment in that the operator service system 200 (FIG. 1) of the first embodiment is deleted. Moreover, in the second embodiment, the variant term detection unit 510 is provided in the speech recognition system 100' (Client), and the phoneme recognition unit 520 is provided in the dictionary updating system 300' (Server). Therefore, the following explanation focuses on the points of dissimilarity between the first and second embodiments, i.e., the variant term detection unit 510 and the phoneme recognition unit 520, as well as the units (i.e., the comprehension control unit 180, the variant term accumulation unit 530, the variant frequency analysis unit 540, and the dictionary updating unit 550) for which the process details are modified by the addition of the variant term detection unit 510 and the phoneme recognition unit 520.

The variant term detection unit 510 of the speech recognition system 100' is configured and arranged to monitor the process details of the comprehension control unit 180 and the operation setting unit 160. More specifically, the variant term detection unit 510 is configured and arranged to detect the status of dialogs in which variant terms occur, and to detect terms that are the source of those variant terms (destination names if the operation is the setting of a destination). For example, the variant term detection unit 510 detects the flow of the following interaction (dialog elements): 1) "initial utterance" of the user is unrecognizable or misrecognized; 2) the user tries to set the destination by re-uttering or by an operation other than uttering speech; and 3) a facility name is ultimately set as the destination. In such case, the variant term detection unit 510 is configured and arranged to detect that the "initial utterance" uttered by the user in 1) is the basis of a variant term, i.e., an "abbreviation" or a "nickname", of "a facility name" (base term), which is ultimately set as the destination in 3).

More specifically, when the variant term detection unit 510 determines that "a candidate recognition term that has the prescribed recognition score cannot be obtained for an (n)th uttered speech of the user, or, the user uttered a negative reply to the system's confirmation response even though a candidate was obtained with the prescribed recognition score based on dialog between the comprehension control unit 180 and the user", and "the operation is complete (if the operation is one that sets a destination, then some destination is set) by a subsequent utterance ((n+1)th utterance, but not counting the negative utterance if it is included in the n+1 utterances) or a subsequent operation other than uttering speech which sets the destination (e.g., operation of a switch)", then the variant term detection unit 510 is configured to extract a variant term (first variant term) included in the user's (n)th uttered speech since the variant term (first variant term) "does not exist in the recognition dictionary". The variant term detection unit 510 is also configured to extract a second term indicating the destination name (base term) stored in the recognition dictionary, which is set by the (n+1)th utterance or another operation as the destination, as a "basis of a variant".

Subsequently, the variant term detection unit 510 is configured to send the user's "initial utterance", which corresponds to the first term, to the phoneme recognition unit 520 as uttered speech data, and also sends the base term (determined destination name) to the variant term accumulation unit 530. The speech recognition system 100' of the second embodiment is configured and arranged to record (buffer) the user's "initial utterance" until the dialog sequence is complete.

In order to monitor the dialog status, the comprehension control unit 180 is configured to detect that the first term does not exist in the recognition dictionary 140 (i.e., it doesn't match a facility name (base term) stored in the recognition dictionary 140) after the character string information of the first term is extracted as a result of the speech recognition process performed by the character string information input unit 170 from the user's (n)th uttered speech. The comprehension control unit 180 is also configured to output a response to the user based on the detection result that the first term does not exist in the recognition dictionary 140 to prompt the user for (n+1)th and subsequent uttered speech. The comprehension control unit 180 is further configured to detect whether the second term included in the user's (n+1)th or subsequent uttered speech matches a facility name (base term) registered in the recognition dictionary 140. The comprehension control unit 180 is then configured to determine an index (input character string information) based on the detection result that the second term included in the user's (n+1)th or subsequent uttered speech matches a facility name in the recognition dictionary 140, and to send an operation command to the operation setting unit 160 to set destination to the facility name (base term). In addition, the operation setting unit 160 is configured to send the facility name (base term), which is the set destination, to the variant term detection unit 510.

Figure 14:
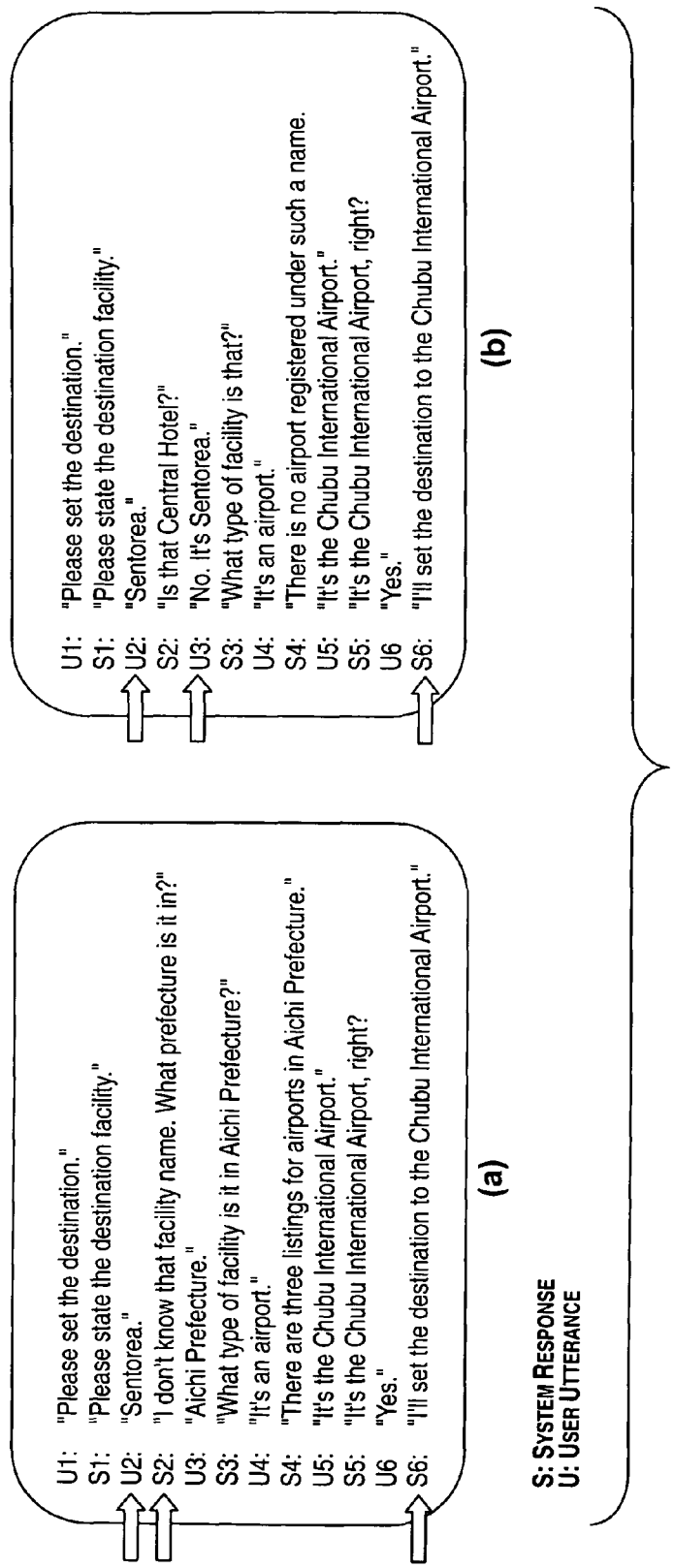
FIG. 14 shows a several examples of dialog between a speech recognition system and a user for setting a destination in accordance with the second embodiment of the present invention.

FIG. 14 shows examples of dialog between the user and the speech recognition system 100' used to detect of the dialog status and the variant term executed in accordance with the second embodiment of the present invention. The arrows in FIG. 14 point to the portions of the dialogs where the dialog elements 1) to 3) explained above are detected. In a diagram (a) of FIG. 14, the comprehension control unit 180 is configured to detect that utterance "Sentorea" of the user (the user utterance U2 in the diagram (a) of FIG. 14) after the user expresses the intention to set the destination (the user utterance U1 in the diagram (a) of FIG. 14) is unrecognizable based on the comprehension status (the system response S2 in the diagram (a) of FIG. 14). Based on subsequent dialog, the destination is set to "Chubu International Airport" (the system response S6 in the diagram (a) of FIG. 14). Although, in the examples shown in FIG. 14, the destination is set by uttered speech of the user, the destination may be set by, for example, an operation of a switch or switches. For example, the comprehension control unit 180 can be configured to output a response that prompts the user to make an input by an operation other than speech. Furthermore, if the facility name (base term) is determined by an operation other than a user's speech, then the set facility name (base term) can be detected as an index (input character string information).

The variant term detection unit 510 is configured to detect that the user's uttered speech "Sentorea" (the user utterance U2 in the diagram (a) of FIG. 14) is a variant term of "Chubu International Airport". Thus, the variant term detection unit 510 is configured to send the uttered speech data to the phoneme recognition unit 520 of the dictionary updating system 300' (Server), and to simultaneously send the facility name "Chubu International Airport" to the variant term accumulation unit 530.

In the example of dialog shown in a diagram (b) of FIG. 14, the user gives a response (the user utterance U3 in the diagram (b) of FIG. 14), which corresponds to a negation and a correction, to the confirmation response (the system response S2 in the diagram (b) of FIG. 14) of the speech recognition system 100' (Client). Subsequently, Chubu International Airport is set as the destination by a dialog similar to the one in the diagram (a) of FIG. 14. Thus, in the example shown in the diagram (b) of FIG. 144 too, the variant term detection unit 510 is configured to detect that the user's uttered speech "Sentorea" (the user utterance U2 in the diagram (b) of FIG. 14) immediately before the negation (the user utterance U3 in the diagram (b) of FIG. 14) is a variant term of "Chubu International Airport". Thus, the variant term detection unit 510 is configured to send the uttered speech data to the phoneme recognition unit 520 of the dictionary updating system 300' (Server), and to simultaneously send the facility name "Chubu International Airport" to the variant term accumulation unit 530. Moreover, the speech recognition system 100' may be configured and arranged to issue a command to the comprehension control unit 180 to present a verification response, such as, "Does your previous speech 'Sentorea (recorded speech)' mean the Chubu International Airport?" when the variant term detection unit 510 detects the dialog status such as the ones shown in the diagrams (a) and (b) of FIG. 14. Furthermore, the speech recognition system 100' may further be configured to send the uttered speech (first variant term) to the dictionary updating system 300' (Server) as a variant term only if the user's response to the verification response is positive.

The phoneme recognition unit 520 is configured to recognize the phonemes of the user's uttered speech, which was sent from the variant term detection unit 510. In contrast to so-called speech recognition, which recognizes the user's uttered speech in units of the word or in units of the connected words, phoneme recognition recognizes the user's uttered speech in units of "phonemes", i.e., minimum units (e.g., "a", "i", "ka", "ki", "gyo", "N", and the like in Japanese language system), that are used to distinguish the meaning of words. For example, if the words Tokyo Tower are recognized as speech, then the result is "Tokyo Tower". However, if the phonemes in the speech "Tokyo Tower" are recognized, then the phoneme string information is "to:kyo:tawa:" in Japanese language system (the colon ":" is a phoneme symbol that indicates the prolonged sound). The result of phoneme recognition of the user's uttered speech "Sentorea" discussed above is "Sentorea". Furthermore, phoneme recognition is enabled by re-registering the historical content of the recognition dictionary 140 of the speech recognition system 100' as phoneme strings instead of words. The phoneme recognition unit 520 is configured to define the phoneme string information of the first term that has character string information sent from the variant term detection unit 510 as a variant term, and to send the phoneme string information to the variant term accumulation unit 530. The phoneme string information sent from the phoneme recognition unit 520 is associated with the facility name (base term) sent from the variant term detection unit 510, and accumulated and stored in the variant term accumulation unit 530 as cumulative variant term data as shown in FIG. 15.

Furthermore, the variant term accumulation unit 530 is configured and arranged to accumulate and store cumulative variant term data entries (pairs of a facility name and the phoneme recognition result) along with a timestamp. FIG. 15 is a schematic diagram illustrating an example of the cumulative variant term data stored in the variant term accumulation unit 530. The cumulative variant term data shown in FIG. 15 has the same format as the example of the cumulative variant term data stored in the variant term accumulation unit 320 in FIG. 7 in the first embodiment except that the utterance label portion is the phoneme recognition result (phoneme string information) in the cumulative variant term data shown in FIG. 15.

When, for example, the user's pronunciation or noise conditions are poor, then errors may be included in the phoneme recognition results. For example, as shown in FIG. 15, when a variant term is detected in the dialog between the user and the speech recognition system 100' (Client), there are cases in which, even though the user has consciously uttered "Sentorea", which is a principal variant term of a formal facility name "Chubu International Airport", the utterance is misrecognized in the speech recognition system 100' as, for example, "Sentoria" or "Sentonia", because of ambient noise or individual differences in, for example, user pronunciation or intonation. Accordingly, in the second embodiment of the present invention, even if an utterance is misrecognized in the speech recognition system 100', all variant terms of, for example, "Sentoria", which constitute phoneme string information for which the inter-phoneme distance to "Sentorea" is within a prescribed distance, are output to the variant frequency analysis unit 540. Then the variant frequency analysis unit 540 is configured to analyze the occurrence frequency of the variant terms uttered by numerous users including the misrecognized terms, and to extract "Sentorea" which is the principal variant term that has the highest occurrence frequency. The inter-phoneme distance is discussed in detail in, for example, Hiraki Ishikawa, and Eiichirou Sumida "A computer recovering its own misheard—Guessing the original sentence from a recognition result based on familiar expressions—" in ATR Journal, No. 37, 1999. In addition, the inter-phoneme distance is calculated by using a well-known method such as the Mahalanobis distance method, the Bhattacharyya distance method, and the Kullback-Leibler distance method.

The variant frequency analysis unit 540 is configured to periodically examine the cumulative variant term data entries accumulated in the variant term accumulation unit 530, and to tabulate the occurrence frequencies of variant terms for a given formal facility name. Similarly to the first embodiment, the variant frequency analysis unit 540 is configured to perform the process of analyzing the occurrence frequencies at prescribed time intervals (e.g., every month). In addition, similarly to the first embodiment, the variant frequency analysis unit 540 may be configured to perform the analysis process when the difference between the amount of cumulative variant term data in the variant term accumulation unit 530 that was used in the previous occurrence frequency analysis process and the current amount of data reaches a prescribed amount. In the occurrence frequency analysis process, the variant frequency analysis unit 540 is configured to extract data for each formal facility name, and to compute the occurrence frequency for each variant term of each facility name. As a result of the occurrence frequency analysis that is performed at prescribed time intervals, the variant terms that exceed the prescribed threshold Th(Hi) are set as principal variant terms their variant term registration flags are consequently turned on so that the principle variant terms are registered in the recognition dictionary 140 as in the first embodiment. However, the variant terms that fall below the prescribed threshold Th(Lo) are set as variant terms to be deleted by turning on their variant term deletion flags so that these variant terms are deleted from the recognition dictionary 140. Accordingly, it is possible to extract the variant terms that are uttered by most users, i.e., the principal variant terms. Specifically, the variant frequency analysis unit 540 is configured to compute (count) the occurrence frequency of each utterance label that corresponds to each facility name as in the first embodiment. However, since the phoneme string information may contain errors as discussed above, the majority rule method or the like may be used to extract, for example, the three high-order phoneme string patterns. In addition, the variant frequency analysis unit 540 may be configured to use a clustering method, which is based on the closeness of phoneme string information, to extract the principle variant terms.

Figure 16:
FIG. 16 is a schematic diagram illustrating an example of phoneme string clustering utilized in the recognition dictionary system in accordance with the second embodiment of the present invention.

FIG. 16 is a schematic diagram illustrating an image of phoneme string clustering. A conventional K-means method or the like can be used as the clustering method. If a number of representative points are extracted by clustering, then these points are defined as phoneme strings of the variant term, and the frequency values of phoneme strings outside of the representative points that belong to each cluster are added to the frequency value of the relevant representative point. The frequency value added may be weighted in accordance with the distance from the representative point (size of the difference in the phoneme). As a result, "tyu:buku:ko:" (Chubu Airport), "Sentorea" (Sentorea), and "tyu:businnkokusaiku:ko:" (Chubu New International Airport) are extracted as phoneme string candidates, and their frequency values can also be acquired simultaneously.

Figure 17:
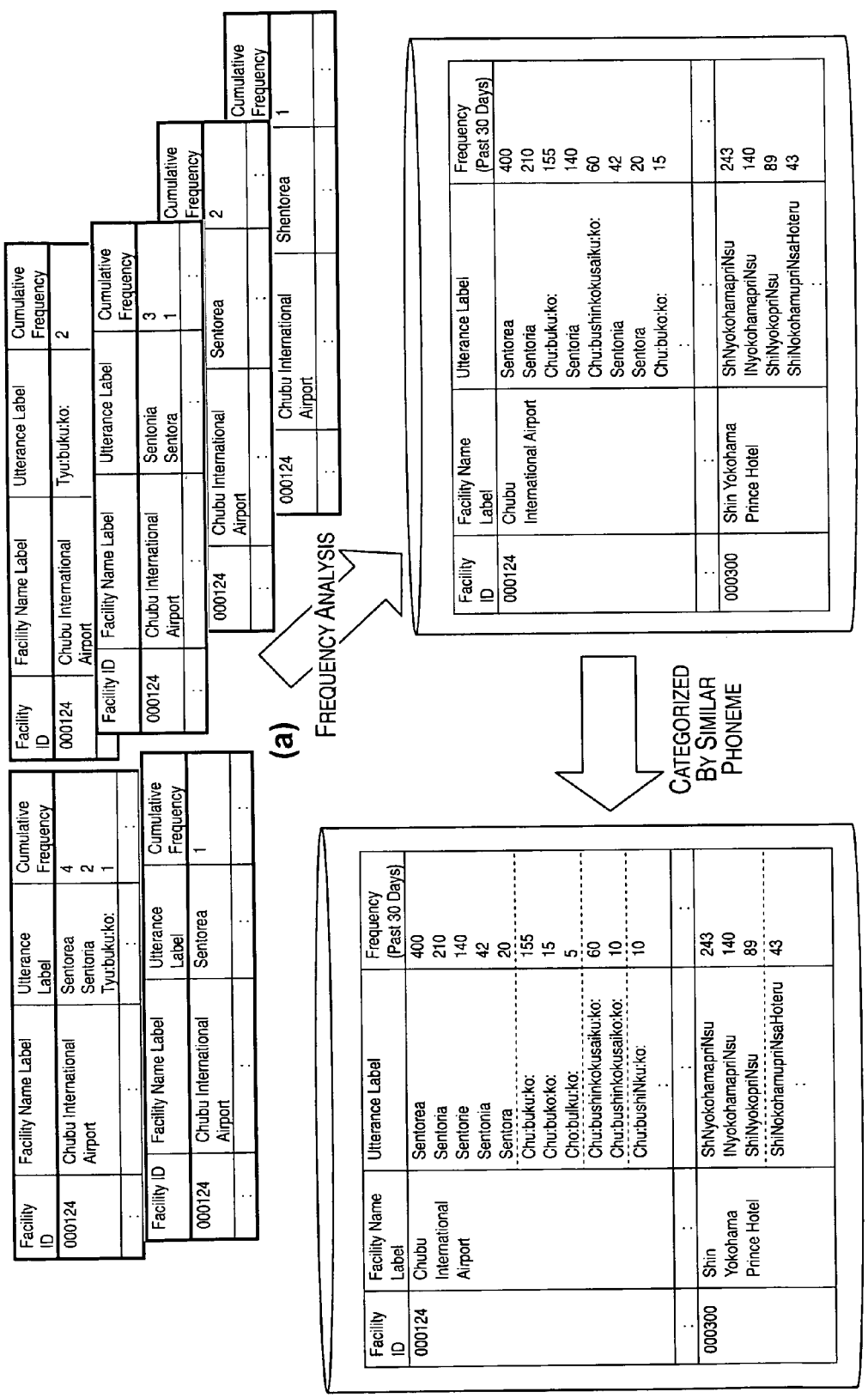
FIG. 17 is a series of schematic diagrams illustrating an example of variant frequency analysis process executed in a variant frequency analysis unit of the dictionary updating system of the recognition dictionary system in accordance with the second embodiment of the present invention.

Furthermore, when the variant frequency analysis unit 540 analyzes the occurrence frequency of the utterance labels (phoneme string information entries), which are the variant terms that correspond to the facility name, the variant frequency analysis unit 540 is configured to categorize every utterance label that matches the phoneme included in the utterance label within a prescribed inter-phoneme distance (i.e., every similar utterance label) as shown in diagrams (a) to (c) of FIG. 17. In the second embodiment, the clustering method described in FIG. 16 is used as the categorization method. As shown the diagram (c) of FIG. 17, the variant frequency analysis unit 540 is configured to categorize every utterance label that is similar to the utterance label that corresponds to the facility name label (base term). Then, the variant frequency analysis unit 540 is configured to extract a plurality of utterance labels among the variant terms included in the categorization, each of which exceeds the threshold Th(Hi) (e.g., 150), as principal variant terms. In the diagram (c) of FIG. 17, "Sentorea", "Sentoria", and "Chu:buku:ko" are determined to be the principal variant terms. Accordingly, it is possible to register a plurality of principal variant terms in the recognition dictionary 140 for one facility name label (base term).

In addition, as discussed above, even in a case where misrecognition of the term occurs in the speech recognition system 100', every similar utterance label is categorized, and it is therefore possible to extract principal variant terms that exclude the misrecognition in the speech recognition system 100'. More specifically, the occurrence frequency of those terms misrecognized by the speech recognition system 100' is lower than those that are not misrecognized. Alternatively, even if the speech recognition system 100' misrecognizes the same term with high frequency, and even if the phoneme string information of a principal variant term is misrecognized, the misrecognized phoneme string information itself is set as the phoneme string information of a principal variant term. Therefore, it is possible to extract the more appropriate principal variant term than to set the correct phoneme string information.

Alternatively, the variant frequency analysis unit 540 can be configured to only extract a plurality of utterance labels of the variant terms included in the categorization and for which the frequency is highest and exceeds the threshold Th(Hi) as the principal variant terms in each category.

Next, the dictionary updating unit 550 is configured to perform the dictionary update process similarly to the first embodiment. More specifically, in the dictionary update process, the terms (variant terms to be deleted) that are assigned the variant term deletion flag are deleted from the recognition dictionary 140, and the terms (principal variant terms) that are assigned the variant term registration flag are registered in the recognition dictionary 140. Accordingly, the variant frequency analysis unit 540 is configured to categorize every utterance label that is similar to the utterance label that corresponds to a facility name (base term), and to extract a plurality of utterance labels from among the variant terms included in the categorization for which the occurrence frequency exceeds the threshold Th(Hi) (e.g., 150) as principal variant terms. In the example shown in FIG. 17, the utterance labels "Sentorea", "Sentoria" and "Chu:buku:ko" are extracted as the principal variant terms for the formal facility name "Chubu International Airport". Moreover, as shown in a diagram (d) of FIG. 18, the dictionary updating unit 550 is configured to register the extracted utterance labels "Sentorea", "Sentoria" and "Chu:buku:ko" (the principal variant terms) in the recognition dictionary 140 for each category, unlike the first embodiment. More specifically, the principal variant terms "Sentorea" and "Sentoria" are associated and registered in the recognition dictionary 140. Moreover, since the principal variant term "Chu:buku:ko" differs from the category that includes the principal variant terms "Sentorea" and "Sentoria" as shown in FIG. 17, and is registered in the recognition dictionary 140 without any association to "Sentorea" or "Sentoria" as divided by the dash-line in the diagrams (b) to (d) of FIG. 18. Furthermore, as shown in the diagrams (a) to (d) of FIG. 18, in a case in which "Sentorea" and "Sentoria" are associated and registered, they need not be registered simultaneously, and either may be registered before the other.

Accordingly, with the recognition dictionary system of the second embodiment, it is possible to determine principal variant terms and update the recognition dictionary 140. The recognition dictionary 140 in a state after the dictionary update status is similar to the recognition dictionary 140 as shown in FIG. 11 except that the pronunciation (uttered terms) column contains the phoneme string information and the principal variant terms are registered by the category.

In the second embodiment, the user's residential area, age group, and the like are not included when extracting the principal variant term. However, there is a possibility that differences in region of the user's residence and differences between generations of the users may have a significant effect upon the "nicknames" and "abbreviations" used for a facility name. Accordingly, the variant term detection unit 510 of the second embodiment can be configured to record the "user attributes", such as the user's residential area and age group, when the variant terms are sent to the variant term accumulation unit 530 so that the occurrence frequency analysis process is performed by user attribute. In such case, the variant term accumulation unit 530 is configured and arranged to associate, accumulate, and store determined facility names (base terms) and user attribute information, which comprises at least one of the user's residential area, age group, family composition, and vehicle attribute. The variant frequency analysis unit 540 is configured to analyze the occurrence frequencies of the variant terms by the user attribute information, and to determine the principal variant terms by user attribute information. The dictionary updating unit 550 is then configured to register the principal variant terms in the recognition dictionary 140 of the user to whom the corresponding user attribute information belongs. Accordingly, when the variant frequency analysis unit 540 performs the occurrence frequency analysis process by user attribute as explained above, then even if a variant term stands out for a specific region or age group, it is possible to provide the recognition dictionary 140 that appropriately reflects traits. Accordingly, it is possible to appropriately set variant terms, which vary among generations and regions, as principal variant terms, and to register variant terms suited to users in the recognition dictionary 140.

Accordingly, the recognition dictionary system of the second embodiment is configured and arranged to detect, accumulate, store, and analyze the occurrence of variant terms that correspond to facility names based on a dialogs taken place for the purpose of setting a destination between the user and the speech recognition system 100' (Client). The recognition dictionary system is then configured to update the recognition dictionary 140 to reflect the detected variant terms. Therefore, it is possible to provide a recognition dictionary 140 that appropriately reflects variant terms (words that have the same meaning but have a different sound) that have a meaning that is equivalent to terms that are initially registered in the recognition dictionary 140 but have different character string information, i.e., "nicknames" and "abbreviations" often uttered by the majority of users. As a result, it is possible to improve recognition performance, reduce the time it takes to accomplish a task, such as setting a destination, and to significantly improve user friendliness.

In addition, the variant term detection unit 510 is configured to detect the occurrence of a variant term based on the status of a dialog with the user or on an operation other than dialog, and it is therefore possible to automatically accumulate and store variant terms in the variant term accumulation unit 530. Accordingly, cumulative variant term data is accumulated and stored in the variant term accumulation unit 530 every time a variant term occurrence is detected. Therefore, it is possible to extract variant terms that reflect the user's actual usage.

In addition, in the second embodiment, the speech recognition system 100' (Client) and the dictionary updating system 300' (Server) are connected via the communication devices 407 and 408 (FIG. 2) as in the first embodiment. Therefore, when the variant frequency analysis unit 540 has newly set a principal variant term, the dictionary updating unit 550 can update the recognition dictionary 140 as needed in order to register the new principal variant term. Furthermore, if the occurrence frequency of a variant term that is registered in the recognition dictionary 140 decreases, the relevant variant term is deleted. Therefore, even if a variant term of a facility name transforms over time, the recognition dictionary 140 can be updated to appropriately reflect such transformation. Accordingly, it is also possible to expect the effect of suppressing a decline in recognition performance due to the registration of inappropriate variant terms in the recognition dictionary 140.

There are minor (rare) variant terms among the variant terms. Furthermore, if the user's pronunciation or the noise condition is poor, then errors occur in the phoneme recognition results, and a wrong variant term may end up being included in the cumulative variant term data due to those errors in the phoneme recognition results. However, with the method according to the second embodiment, the occurrence frequency analysis process performed by the variant frequency analysis unit 540 uses, for example, the majority rule method to extract phoneme string patterns, such as the three high-order patterns, and the occurrence frequency analysis process is performed based on these extractions, which include the wrong (misrecognized) information and the minor information. As a result, the recognition dictionary 140 is updated with attention given only to high frequency variant terms. Therefore, it is possible to exclude the anomalistic variant terms, and to suppress a decline in recognition performance caused by the registration of inappropriate terms in the recognition dictionary 140. In addition, the variant frequency analysis unit 540 is configured to use, for example, a clustering method to extract at least one phoneme string pattern (phoneme string information) which has a high occurrence frequency from a plurality of phoneme string patterns (phoneme string information). Therefore, when detecting the occurrence of variant terms based on dialog between the user and the speech recognition system 100' (Client), phoneme string information, which comprises phonemes recognized from the user's uttered speech, can be extracted from variant terms, and the phoneme string information that has the highest ranked probability (merging of the ranking of phoneme string information uttered by most users) is extracted as a principal variant term.

In addition, with the recognition dictionary system of the second embodiment, if uttered speech is detected that cannot be recognized based on dialog and some facility name (base term) is ultimately set by subsequent dialog or an operation other than dialog, then it is possible to detect the uttered speech, which could not be recognized, as a variant term of the ultimately set facility name (base term). In addition, if a negation or correction is detected by dialog and some facility name (base term) is ultimately set by subsequent dialog or an operation other than dialog, then the uttered speech immediately before the abovementioned correction and negation can be detected as a variant term of the ultimately set facility name (base term).

Furthermore, the comprehension control unit 180 can be configured to confirm the occurrence of a variant term with the user by a verification response. Also, the variant term accumulation unit 530 may be configured to accumulate and store a variant term only if the user recognizes that initial uttered speech as a variant term of an ultimately determined term. More specifically, the comprehension control unit 180 can be configured to output a verification response that confirms with the user that the first term included in the user's (n)th uttered speech is a variant term of a set facility name (base term) when the second term indicating the set facility name (base term) included in the user's (n+1)th or subsequent uttered speech exists in the recognition dictionary 140. Furthermore, the variant term detection unit 510 can be configured to determine that the first term is a variant term of the set facility name (base term) if the user's response to the verification response is one that positively acknowledges the variant term. Accordingly, it is possible to accumulate and store variant terms with higher precision.

Third Embodiment

Figure 19:
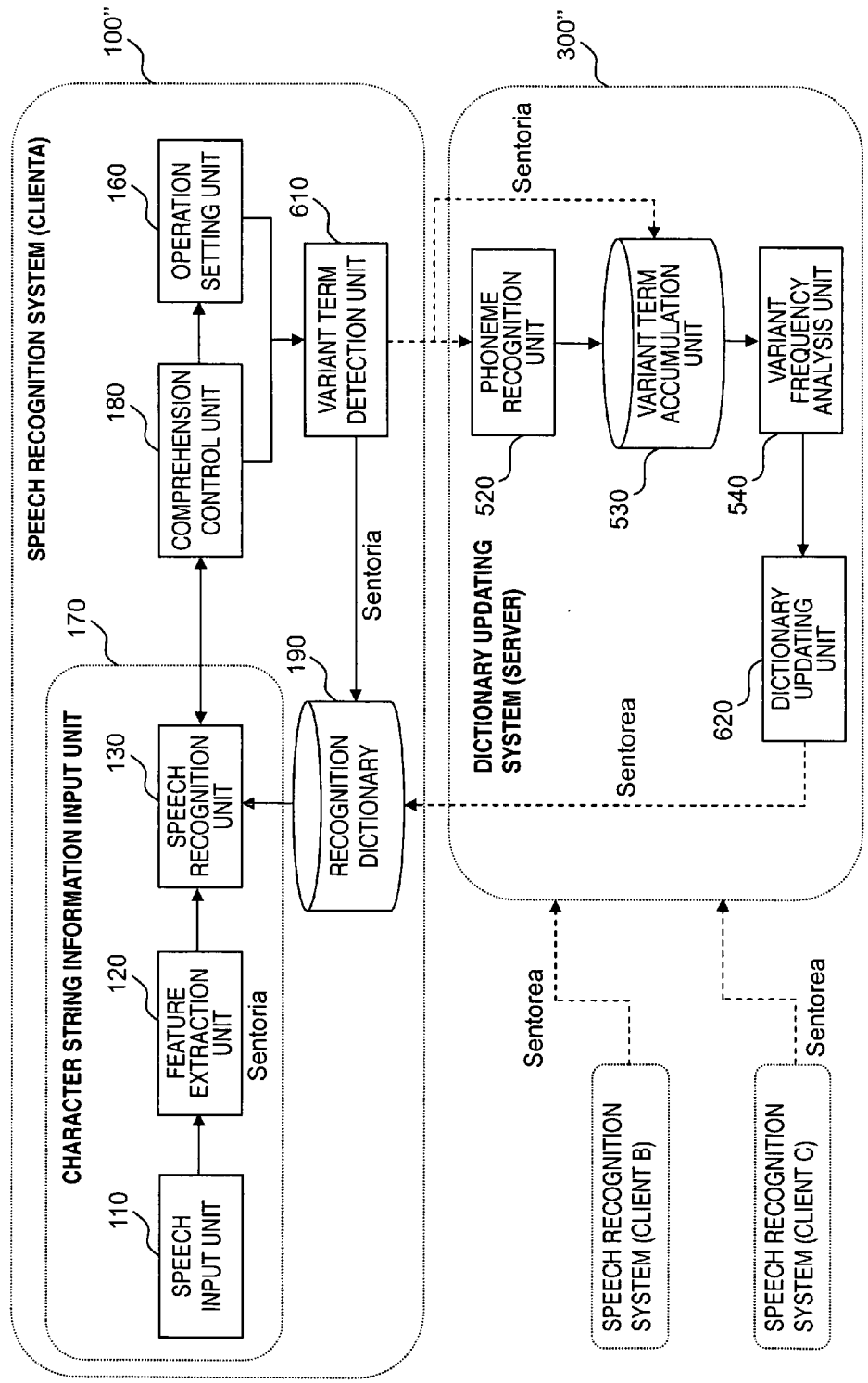
FIG. 19 is an overall block diagram illustrating a recognition dictionary system in accordance with a third embodiment of the present invention.
Figure 20:
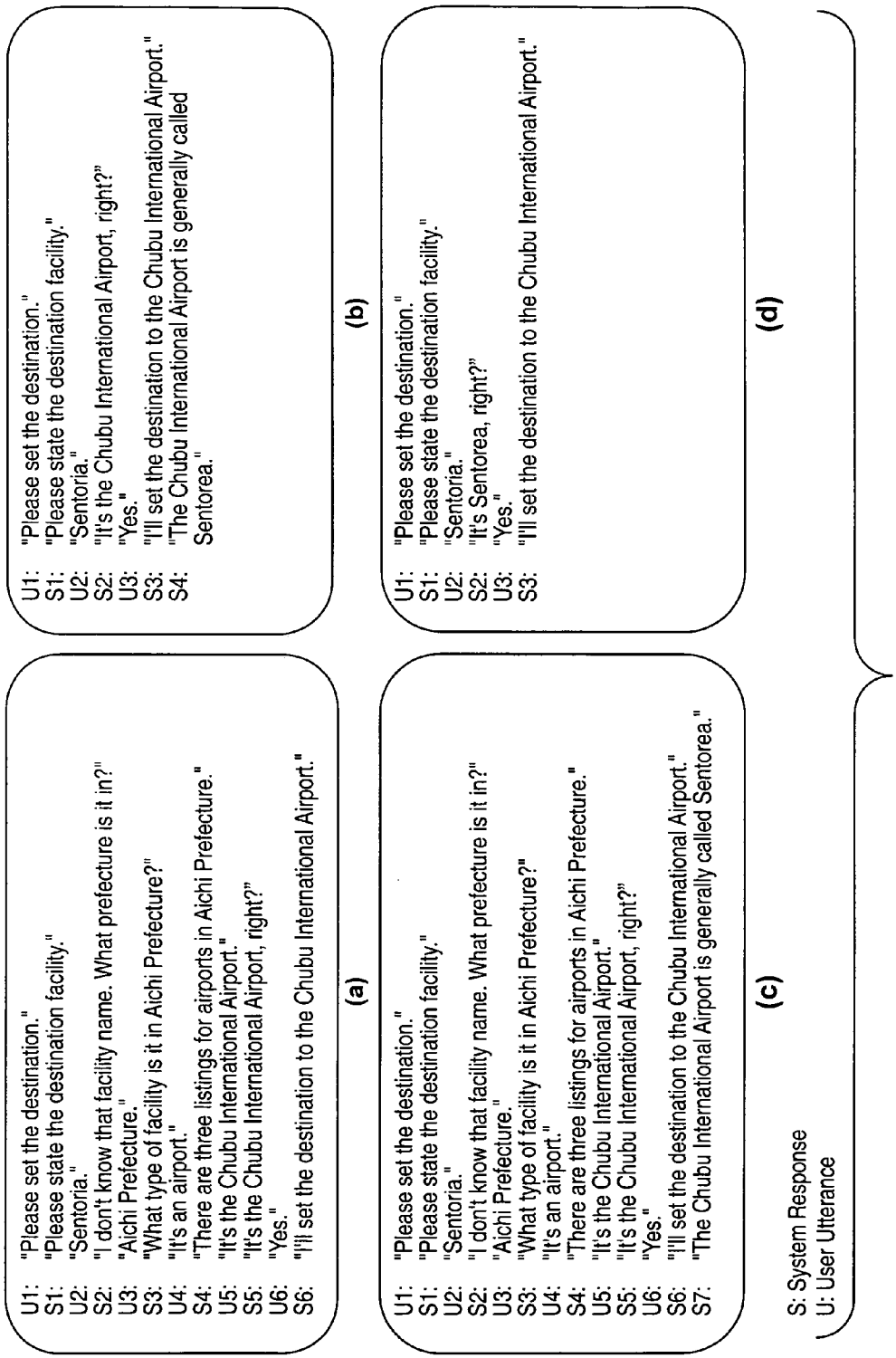
FIG. 20 shows a several examples of dialogue between a speech recognition system and a user for setting a destination in accordance with the third embodiment of the present invention.

Referring now to FIGS. 19 and 20, a recognition dictionary system in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity. The parts of the third embodiment that differ from the parts of the first and second embodiments will be indicated with a double prime (").

In the second embodiment, the speech recognition system 100' (Client) itself is configured and arranged to detect the occurrence of variant terms, and the variant terms that were accumulated and stored by this detection function are reflected in the recognition dictionary 140. In the third embodiment, a speech recognition system 100" (Client A) itself is configured and arranged to detect the occurrence of variant terms, and the variant terms detected are reflected in a recognition dictionary 190 separately from the variant terms accumulated and stored in the variant term accumulation unit 530.

FIG. 19 is an overall block diagram illustrating the recognition dictionary system in accordance with the third embodiment of the present invention. As seen in FIG. 19, the recognition dictionary system of the third embodiment is adapted to a navigation speech recognition apparatus that includes the speech recognition system 100" (Client A) and a dictionary updating system 300" (Server).

The speech recognition system 100" (Client A) includes the operation setting unit 160, the character string information input unit 170, the comprehension control unit 180, the recognition dictionary 190, and a variant term detection unit 610. The character string information input unit 170 includes the speech input unit 110, the feature extraction unit 120, and the speech recognition unit 130.

The dictionary updating system 300" (Server) includes the phoneme recognition unit 520, the variant term accumulation unit 530, the variant frequency analysis unit 540, and a dictionary updating unit 620. The dictionary updating unit 620 preferably constitutes a recognition dictionary update unit of the present invention.

The recognition dictionary system of the third embodiment differs from the recognition dictionary system of the second embodiment in that variant terms are registered in the recognition dictionary 190 by the variant term detection unit 610 of the speech recognition system 100" (Client A), and in that, if the dictionary updating unit 620 is configured to perform a dictionary update process in order to register a principal variant term in the recognition dictionary 190, then a value of a corresponding principal variant term flag is set to 1. The similar effects of the second embodiment of the present invention can be obtained in the third embodiment of the present invention.

The variant term detection unit 610, the recognition dictionary 190, and the dictionary updating unit 620, which are points of dissimilarity between the second and third embodiments, will now be explained in more detail. The variant term detection unit 610 is configured to perform the similar functions as the variant term detection unit 510 in FIG. 13. In addition, the variant term detection unit 610 is further configured to register the detected variant term in the recognition dictionary 190 based on the result of the phoneme recognition unit 520 recognizing the phonemes of the detected variant term. The recognition dictionary 190 is configured to perform the substantially similar functions as the recognition dictionary 140 of the first and second embodiments. The recognition dictionary 190 of the third embodiment differs from the recognition dictionary 140 of the second and third embodiments in that an additional column is provided for storing the value of the principal variant term flag (discussed later) in the recognized term data (shown in FIG. 3) stored in the recognition dictionary 190.

The dictionary updating unit 620 is configured to set the value of the principal variant term flag of the principal variant term extracted by the variant frequency analysis unit 540 to 1, and to register the principal variant term in the recognition dictionary 190. Moreover, the variant term detection unit 610 is configured to set the principal variant term flag of the variant term detected by the variant term detection unit 610 to 0, and to register the detected variant term in the recognition dictionary 190.

The user of the speech recognition system 100" (Client) may actually utters "Sentoria" instead of "Sentorea", or even when the user intends to utter "Sentorea" the term "Sentoria" may be recognized by the speech recognition system 100" due to, for example, the user's accent or intonation. In other words, the speech recognition system 100" may recognize a user specific variant term of "Sentoria" (second variant term) used by the user of the speech recognition system 100". In such case, the variant term detection unit 610 is configured to detect the variant term "Sentoria" and to send the variant term to the variant term accumulation unit 560. However, numerous users that use a speech recognition system (Client B), a speech recognition system (Client C), and numerous other systems that are connected to the dictionary updating system 300" (Server) utter the variant term "Sentorea", which is also sent and accumulated in the variant term accumulation unit 530. Therefore, the variant frequency analysis unit 540 is configured to perform the occurrence frequency analysis process to determine that "Sentorea", which is phoneme string information that has a high occurrence frequency, is a principal variant term. Thus, the dictionary updating unit 620 is configured to register the term "Sentorea" in the recognition dictionary 190 as a principal variant term of "Chubu International Airport". However, the term "Sentoria", which is phoneme string information that has a low occurrence frequency, is not determined to be a principal variant term by the variant frequency analysis unit 540 and therefore is not registered in the recognition dictionary 190. Consequently, a situation arises wherein the speech recognition system 100" (Client A) cannot recognize the user specific variant term "Sentoria" (second variant term).

Accordingly, in the third embodiment, in order to deal with the above circumstances, the phoneme recognition unit 520 is configured to recognize the phonemes of the detected variant term "Sentoria" for "Chubu International Airport", and the variant term detection unit 610 is configured to register the variant term "Sentoria" in the recognition dictionary 190 that is unique to the speech recognition system 100" (Client A) with value of the principal variant term flag corresponding to the variant term "Sentria" being set to 0. In addition, as mentioned above, the dictionary updating unit 620 is configured to register the principal variant term "Sentorea" determined by the variant frequency analysis unit 540 with the value of the principal variant term flag corresponding to the principal variant term "Sentorea" being set to 1 in a recognition dictionary that is provided to the speech recognition system 100" (Client A), the speech recognition system (Client B), the speech recognition system (Client C), and numerous other systems. In the third embodiment, the dictionary updating unit 620 is configured to register the principal variant terms determined by the variant frequency analysis unit 540 in the recognition dictionary 190. Therefore, the recognition dictionary 190 contains data that is unique to the speech recognition system 100" and data that is shared with other systems such as the speech recognition system (Client B) and the speech recognition system (Client C).

Furthermore, similarly to the first embodiment, the variant frequency analysis unit 540 is configured to categorize similar phoneme string information when the phoneme string information occurrence frequencies are analyzed. Then, the dictionary updating unit 620 is configured to perform registration by category when registering principal variant terms in the recognition dictionary. Specifically, as shown in the diagram (d) of FIG. 18, when the principal variant term "Sentorea" (first phoneme string information) is registered in the recognition dictionary 190, the principal variant term "Sentorea" is registered so that it is associated with the same category as the user specific variant term "Sentoria" (second phoneme string information), which was registered in the recognition dictionary 190 by the variant term detection unit 610.

Accordingly, because the principal variant term "Sentorea" and the user specific variant term "Sentoria" can both be registered in the recognition dictionary 190, the speech recognition system 100" (Client A) can recognize not only principal variant terms that have high occurrence frequencies, but also user specific variant terms that have low occurrence frequencies but used by the user of the speech recognition system 100". In addition, as mentioned above, the user specific variant term "Sentoria" and the principal variant term "Sentoria" are associated and registered in the recognition dictionary 190. Therefore, the speech recognition system 100" may be configured to teach the user that the principal variant term of the formal facility name (base term) is "Sentorea" if the user utters the user specific variant term "Sentoria". Moreover, the principal variant term registered by the dictionary updating unit 620 and the user specific variant term detected by the variant term detection unit 640 are distinguished from each other in the recognition dictionary 190 by the value of the principal variant term flag. In other words, the principal variant term is registered in the recognition dictionary 190 with the value of the principal variant term flag being set to 1, and the user specific variant term is registered in the recognition dictionary 190 with the value of the principal variant term flag being set to 0. Therefore, the speech recognition system 100" can be prevented from mistakenly teaching the user to use the user specific variant term "Sentoria" as a principal variant term of the formal facility name (base term) if the user utters the principal variant term "Sentorea".

The dictionary updating unit 620 is configured to refer to the recognition dictionary 190 for a variant term that was determined by the variant frequency analysis unit 540 as a variant term to be deleted, and to delete such variant term from the recognition dictionary 190 if the value of the principal variant term flag that corresponds to the variant term is 1. If the value of the principal variant term flag is set to 0, then the variant term is not deleted from the recognition dictionary 190 because that variant term is a user specific variant term. Accordingly, even if the occurrence frequency of the user specific variant term is low, the user specific variant term is not automatically deleted from the recognition dictionary 190 by the dictionary updating unit 620. Alternatively, the dictionary updating unit 620 or the speech recognition system 100" can be configured to delete the user specific variant term when appropriate.

FIG. 20 shows examples of dialog conducted between the speech recognition system 100" (Client A) and the user to detect a variant term for the formal facility name "Chubu International Airport". In the example shown in a diagram (a) of FIG. 20, the user utters the user specific variant term "Sentoria" (the user utterance U2 in the diagram (a) of FIG.

20) before "Sentorea", which is a principal variant term of "Chubu International Airport", is registered in the recognition dictionary 190 of the speech recognition system 100" (Client A). Then, the speech recognition system 100" (Client A) is configured to detect "Sentoria" as a variant term of "Chubu International Airport" based on the dialog with the user (the system response S5 and the user utterance U6 in the diagram (a) of FIG. 20). With the first and second embodiments, the variant term "Sentoria" is sent to the dictionary updating system 300 or 300' (Server) and is subject only to the occurrence frequency analysis process, which is performed by the variant frequency analysis unit 330 or 540. However, with the third embodiment, the user specific variant term "Sentoria" is registered as a variant term of "Chubu International Airport" in the recognition dictionary 190 simultaneous to the transmission of the variant term to the dictionary updating system 300" (Server), as discussed above. The data stored in the recognition dictionary 190 before the registration of the user specific variant term "Sentoria" for the formal facility name "Chubu International Airport" may be similar to the data shown in the diagram (a) of FIG. 18, and the data stored in the recognition dictionary 190 after the registration of the user specific variant term "Sentoria" may be similar to the data shown in the diagram (b) of FIG. 18.

Next, as shown in a diagram (b) of FIG. 20, if the user utters the user specific variant term "Sentoria" in a subsequent dialog (the user utterance U2 in the diagram (b) of FIG. 20), then the formal facility name "Chubu International Airport" can be quickly recognized by the speech recognition system 100" (the system response S2 in the diagram (b) of FIG. 20). Subsequently, if the dictionary updating unit 620 registers the principal variant term "Sentorea" in the recognition dictionary 190, then the principal variant term "Sentorea" and the user specific variant term "Sentoria" are registered as variant terms of "Chubu International Airport". The data stored in the recognition dictionary 190 in this state may be similar to the data shown in the diagram (d) of FIG. 18. In the state shown in the diagram (d) of FIG. 18, even if the user specific variant term "Sentoria" is uttered once again, it is possible to quickly set the destination, as in the dialog shown the diagram (b) of FIG. 20(*b*) (the user utterances U2 and U3 and the system response S2 in the diagram (b) of FIG. 20). Moreover, the speech recognition system 100" is configured to simultaneously teach the user that the principal variant term "Sentorea" for the facility name "Chubu International Airport" (the system response U4 in the diagram (b) of FIG. 20) so that the user learns to utter the correct variant term. Furthermore, the speech recognition system 100" may be further configured to delete the user specific variant term "Sentoria" if the user subsequently comes to utter only the principal variant term "Sentorea".

In addition, with the third embodiment, the user can be taught that the principal variant term is generally "Sentorea" not the user specific variant term "Sentoria" because, as discussed above, the variant frequency analysis unit 540 is configured to categorize similar phoneme string information, and the dictionary updating unit 620 is configured to register principal variant terms in the recognition dictionary 190 by category. Accordingly, it is possible to register the user specific variant term "Sentoria" for the formal facility name "Chubu International Airport" so that it is associated with similar phoneme string information, e.g., the principal variant term "Sentorea" for the formal facility name "Chubu International Airport". Therefore, the speech recognition system 100" can reliably determine that the user specific variant term and the principal variant term having similar phoneme string information indicate the same facility name. Accordingly, the terms that merely have similar phoneme string information, e.g., "Sentorral", is not determined to be a variant term of "Chubu International Airport", and is excluded from the teaching. In addition, as discussed above, because the principal variant terms are registered in the recognition dictionary 190 with the principal variant term flag being set to 1, it is possible to teach the user only the principal variant terms. Specifically, if the principal variant term "Sentorea" is uttered, then it is possible to prevent the user from being taught that the user specific variant term "Sentoria" is the principal variant term of "Chubu International Airport".

Figure 18:
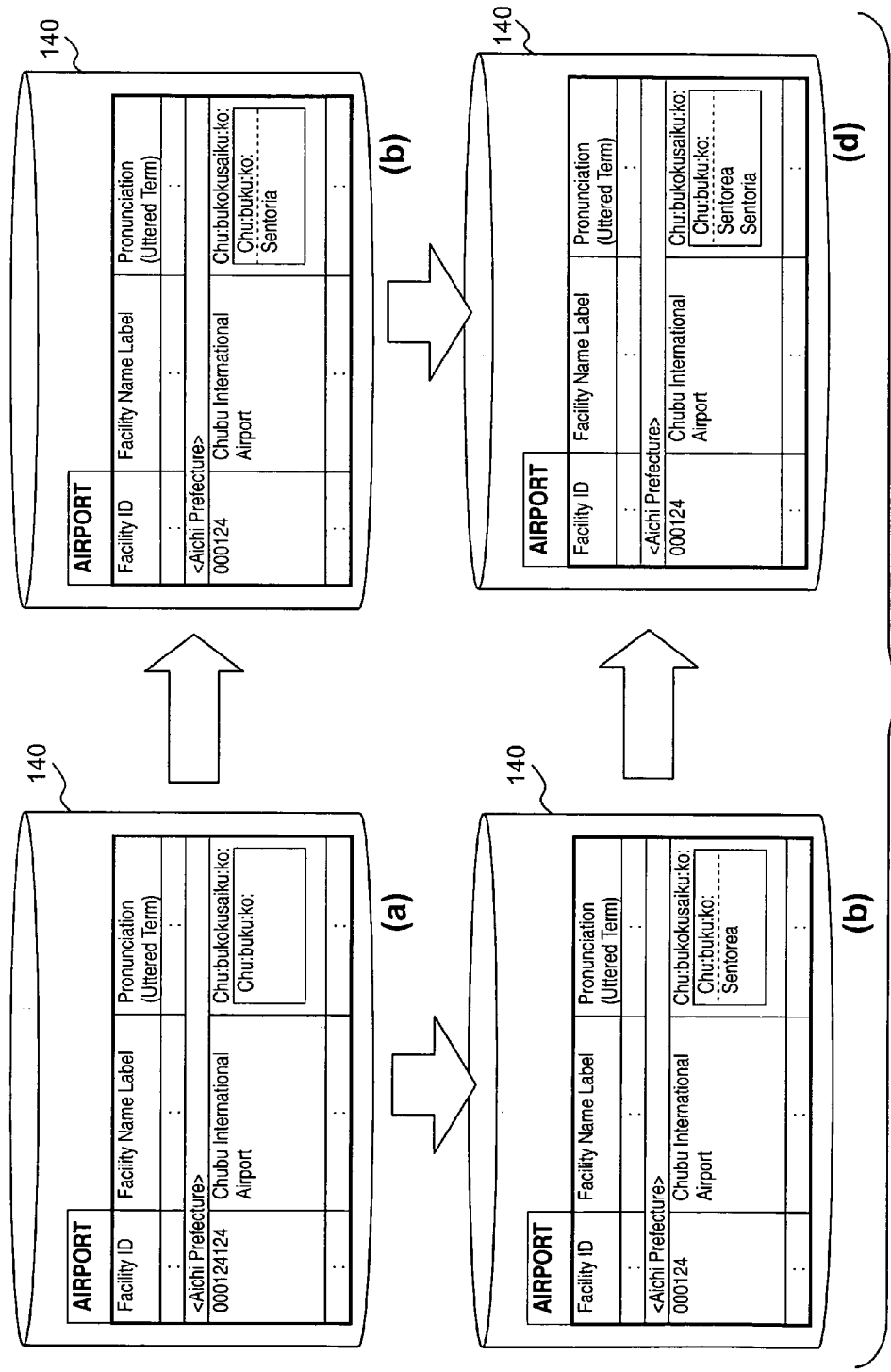
FIG. 18 is a schematic diagram illustrating recognized term data stored in a recognition dictionary of the recognition dictionary system in accordance with the second embodiment of the present invention.

On the other hand, if the user utters the user specific variant term "Sentoria" after the dictionary updating unit 620 has registered the principal variant term "Sentorea" in the recognition dictionary 190 (e.g., the data stored in the recognition dictionary 190 is similar to the data shown in the diagram (c) of FIG. 18), then the speech recognition system 100" (Client A) cannot recognize the user specific variant term "Sentoria", which does not exist in the recognition dictionary 190. Accordingly, as shown in the diagram (a) of FIG. 20, the speech recognition system 100" (Client A) is configured to conduct a dialog with the user and to detect that the user specific variant term "Sentoria" is a variant term of the formal facility name "Chubu International Airport".

Furthermore, when both the principal variant term "Sentorea" and the user specific variant term "Sentoria" are registered as variant terms of the formal facility name "Chubu International Airport", the principal variant term "Sentorea" and the user specific variant term "Sentoria" are associated with the same facility name label, i.e., "Chubu International Airport" (e.g., the data stored in the recognition dictionary 190 is similar to the data shown in the diagram (d) of FIG. 18). Therefore, during the dialog with the user, the user can be taught the principal variant term of the same facility name label that has similar phoneme string information (the user utterance U2 and the system responses S6 and S7 in a diagram (c) of FIG. 20). In addition, the principal variant term "Sentorea", which has phoneme string information that is similar to the user specific variant term "Sentoria", is registered as a variant term of "Chubu International Airport" in the recognition dictionary 190, and therefore, if the user utters the user specific variant term "Sentoria", then it is possible to detect that utterance as the principal variant term "Sentorea" and to compose a response to the user accordingly (the user utterance U2 and the system response S2 in a diagram (d) of FIG. 20). Accordingly, as shown in the diagram (d) of FIG. 20, the dialog with the user can be completed with brevity by inquiring whether the principal variant term "Sentorea" is the correct term. Simultaneously, because the user is asked about the principal variant term once again, it is also possible to teach the principal variant term to the user.

Furthermore, in the third embodiment as well, although the user's residential area, age group, and the like are not included when extracting a principal variant term, there is a possibility that differences among, for example, regions and generations will greatly affect, for example, the "nicknames" and "abbreviations" of the facility name. Accordingly, "user attributes", such as the user's residential area and age group, may be recorded at the same time as the extraction of the principal variant term, and the occurrence frequency analysis process may be performed by user attribute. More specifically, the variant term accumulation unit 530 may be configured to accumulate and store a determined facility name (base term) and a variant term so the those information is associated with user attribute information, which comprises at least one of the user's residential area, age group, family composition, and vehicle attribute. Then, the variant frequency analysis unit 540 may be configured to determine the occurrence frequency of each variant term by user attribute information, and to determine the principal variant terms by user attribute information. The dictionary updating unit 620 may be configured to register principal variant terms in the recognition dictionary 190 of the user to whom the corresponding user attribute information belongs. Thus, when the variant frequency analysis unit 540 is configured to perform the occurrence frequency analysis process by user attribute as explained above, then, even if a variant term stands out for a specific region, age group, and the like, the recognition dictionary 190 can be provided that appropriately reflects such traits. Accordingly, variant terms that vary among generations and regions can be appropriately set as principal variant terms, and variant terms suited to the users can be registered in the recognition dictionary 190.

The present invention is not limited to the structures or constitutions of the first thorough third embodiments explained above, and variations and modifications may be effected without departing from the spirit and scope of the invention.

For example, in the first through third embodiments, all speech recognition processes are accomplished in the speech recognition system 100, 100' or 100" (client side), and only update data for the recognition dictionary 140 or 190 is received from the dictionary updating system 300, 300' or 300" (server). However, the present invention is not limited to such arrangement. For example, the recognition dictionary system of the present invention can be configured and arranged so that the speech recognition system 100, 100' or 100" (client side) sends the speech signal itself, or a feature value of the uttered speech, to the dictionary updating system 300, 300' or 300" (Server), and the dictionary updating system 300, 300' or 300" (Server) is configured to perform all speech recognition processes from the speech recognition unit 130 onward. In addition, it is also possible to arrange the speech recognition system 100, 100' or 100" (client side) as a stand-alone system that does not perform communication. In this case, it is necessary to update the recognition dictionary 140 or 190 by, for example, physically shipping a storage medium, such as a CD-ROM.

In addition, with the second and third embodiments, if the sequence of dialogs discussed above is performed, then the variant term detection units 510 and 610 are configured to regard the user's initial uttered speech as the uttered speech of a variant term for a formal name, and to send the uttered speech of the variant term to the dictionary updating system 300' or 300" (Server). However, the present invention is not limited thereto, and the uttered speech of the variant term can be sent to the dictionary updating system 300' or 300" (Server) only when the comprehension control unit 180 issues a command to present a verification response for the variant term, and the user's response is positive.

In addition, the speech recognition systems 100, 100' and 100" of the first through third embodiments includes the character string information input unit 170, which includes the speech input unit 110, the feature extraction unit 120, and the speech recognition unit 130. However, the present invention is not limited to such arrangement. For example, the character string information input unit 170 can be provided with a device or devices other than the speech input unit 110, the feature extraction unit 120, and the speech recognition unit 130 as long as the device or devices are configured and arranged to input character string information (e.g., user input via a keyboard).

Although the recognition dictionary system in accordance with the first through third embodiments of the present invention are explained as being adapted to the recognition speech system 100, 100' or 100" that is configured to recognize the user's uttered speech in Japanese language, it will be apparent to those skilled in the art from this disclosure that the recognition dictionary system of the present invention is not limited to be adapted to a recognition speech system for Japanese language. More specifically, the recognition dictionary system of the present invention can be adapted to a speech recognition system that is configured to recognize a speech in a language or languages other than Japanese.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part", "section", "portion", "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A recognition dictionary system including a client terminal and a server terminal, the recognition dictionary system comprising:
   a character string information input unit including
      a speech input unit configured and arranged to accept an input of an uttered speech by a user of the client terminal, and
      a speech recognition unit configured to extract character string information corresponding to a term included in the uttered speech by the user;

a comprehension control unit configured to determine a response to the user, the comprehension control unit being further configured to
    detect whether a first term corresponding to information received by (n)th input by the user is not registered in a recognition dictionary that stores at least character string information of a base term,
    output a response that prompts at least (n+1)th input by the user upon detecting that the first term is not registered in the recognition dictionary, and
    detect whether a second term corresponding to information received by the (n+1)th input or subsequent input by the user matches the base term stored in the recognition dictionary;
a variant term detection unit configured to detect the first term as a first variant term, which is not registered in the recognition dictionary but that has a meaning equivalent to the base term stored in the recognition dictionary and has character string information that is different from the character string information of the base term, when the second term matches the base term stored in the recognition dictionary, and to associate the first variant term with the base term;
a phoneme recognition unit configured to transform the input of the uttered speech including the first variant term accepted by the speech input unit into first phoneme string information corresponding to the first variant term;
a variant term accumulation unit configured to accumulate and store the first variant term including the first phoneme string information associated with the base term as the first variant term is detected by the variant term detection unit;
a variant frequency analysis unit configured to analyze an occurrence frequency of the first variant term accumulated and stored in the variant term accumulation unit; and
a recognition dictionary update unit configured to update the recognition dictionary to register the first variant term in the recognition dictionary as a variant term of the base term when the occurrence frequency is higher than a first prescribed value that is greater than one.

2. The recognition dictionary system as recited in claim 1, wherein
the client terminal includes the recognition dictionary, and
the server terminal is connected to the client terminal by a communication network, and includes the variant term accumulation unit, the variant frequency analysis unit and the recognition dictionary update unit.

3. The recognition dictionary system as recited in claim 2, wherein
the client terminal includes the character string information input unit,
the server terminal includes
    the phoneme recognition unit.

4. The recognition dictionary system as recited in claim 3, wherein
the variant frequency analysis unit of the server terminal is configured to categorize the first variant term by the first phoneme string information based on an inter-phoneme distance with respect to other variant terms of the base term stored in the variant term accumulation unit when analyzing the occurrence frequency of the first variant term.

5. The recognition dictionary system as recited in claim 4, wherein
the variant term detection unit is further configured to detect the first variant term and a second variant term having a meaning equivalent to the base term and including second phoneme string information that is different from phoneme string information of the base term, and to associate the second variant term with the base term,
the recognition dictionary update unit is further configured to update the recognition dictionary to register the second variant term in the recognition dictionary as being associated with the first variant term that has been registered in the recognition dictionary as the variant term of the base term when the first phoneme string information of the first variant term does not perfectly match the second phoneme string information of the second variant term but the first phoneme string information of the first variant term is within a prescribed inter-phoneme distance of the second phoneme string information of the second variant term.

6. The recognition dictionary system as recited in claim 5, wherein
the client terminal is configured to present the first variant term to the user when the uttered speech by the user includes the second variant term.

7. The recognition dictionary system as recited in claim 1, wherein
the comprehension control unit is configured to present a confirmation response to the information received by the (n)th input by the user, and to detect that the first term is not registered in the recognition dictionary if the information received by the (n+1)th input by the user in response to the confirmation response includes at least one of a correction expression and a negative expression.

8. The recognition dictionary system as recited in claim 7, wherein
the client terminal further includes
    a speech input unit configured and arranged to accept an input of an uttered speech by the user, and
    a speech recognition unit configured to recognize a recognition term candidate when the uttered speech has a prescribed recognition score, and
the comprehension control unit is configured to detect the first term is not registered in the recognition dictionary when the recognition term candidate is not obtained by the uttered speech in the (n)th input by the user.

9. The recognition dictionary system as recited in claim 8, wherein
the comprehension control unit is configured to output a verification response to confirm with the user that the first term is a variant term of the base term upon detecting that the second term matches the base term stored in the recognition dictionary, and
the variant term detection unit is configured to determine the first term as the first variant term when a response by the user to the verification response indicates that the user positively acknowledges that the first term is the variant term of the base term.

10. The recognition dictionary system as recited in claim 9, wherein
the comprehension control unit is configured to output a response that prompts the at least (n+1)th input other than the input of the uttered speech upon detecting that the first term is not registered in the recognition dictionary.

11. The recognition dictionary system as recited in claim 2, wherein
the variant frequency analysis unit is configured to refer to the variant term accumulation unit at a prescribed time interval, the variant frequency analysis unit being further configured to determine that the first variant term is a deletion target variant term when the occurrence frequency of the variant term falls below a second prescribed value that is smaller than the first prescribed value, and
the recognition dictionary update unit is further configured to delete the first variant term from the recognition dictionary when the variant frequency analysis unit determines that the first variant term is the deletion target variant term.

12. The recognition dictionary system as recited in claim 2, wherein
the client terminal is configured to accept information corresponding to the first variant term that is input by a user for setting a destination with a navigation system.

13. The recognition dictionary system as recited in claim 12, wherein
the variant term accumulation unit is configured to accumulate and store user attribute information including at least one of a residential area, an age bracket, a family composition, and a vehicle attribute of the user with the user attribute information being associated with the base term,
the variant frequency analysis unit is configured to analyze the occurrence frequency of the first variant term for each user attribute information, and
the recognition dictionary update unit is configured to register the first variant term as the variant term of the base term when the occurrence frequency is higher than the first prescribed value in the recognition dictionary used by the user to whom the user attribute information corresponding to the first variant term belongs.

14. A recognition dictionary system including a client terminal and a server terminal, the recognition dictionary system comprising:
character string information inputting means for accepting an input of an uttered speech by a user of the client terminal and for extracting character string information corresponding to a term included in the uttered speech by the user;
comprehension controlling means for determining a response to the user, and including functions for
detecting whether a first term corresponding to information received by (n)th input by the user is not registered in a recognition dictionary that stores at least character string information of a base term,
outputting a response that prompts at least (n+1)th input by the user upon detecting that the first term is not registered in the recognition dictionary, and
detecting whether a second term corresponding to information received by the (n+1)th input or subsequent input by the user matches the base term stored in the recognition dictionary;
variant term detecting means for detecting the first term as a first variant term, which is not registered in the recognition dictionary but has a meaning equivalent to the base term and has different character string information from the character string information of the base term, when the second term matches the base term stored in the recognition dictionary, and for associating the first variant term with the base term;
phoneme recognition means for transforming the input of the uttered speech including the first variant term accepted by the speech input unit into first phoneme string information corresponding to the first variant term;
variant term accumulating means for accumulating and storing the first variant term including the first phoneme string information associated with the base term as the first variant term is detected;
frequency occurrence analyzing means for analyzing an occurrence frequency of the first variant term accumulated and stored by the variant term accumulating means; and
dictionary updating means for updating the recognition dictionary to register the first variant term in the recognition dictionary as a variant term of the base term when the occurrence frequency is higher than a first prescribed value that is greater than one.

15. A recognition dictionary system updating method for updating a recognition dictionary system including a client terminal and a server terminal, the recognition dictionary system updating method comprising:
accepting an input of an uttered speech by a user of the client terminal;
extracting character string information corresponding to a term included in the uttered speech by the user;
detecting whether a first term corresponding to information received by (n)th input by the user is not registered in a recognition dictionary that stores at least character string information of a base term;
outputting a response that prompts at least (n+1)th input by the user upon detecting that the first term is not registered in the recognition dictionary;
detecting whether a second term corresponding to information received by the (n+1)th input or subsequent input by the user matches the base term stored in the recognition dictionary;
detecting the first term as a first variant term, which is not registered in the recognition dictionary but has a meaning equivalent to the base term and has different character string information from the character string information of the base term, when the second term matches the base term stored in the recognition dictionary, and associating the first variant term with the base term;
transforming the input of the uttered speech including the first variant term accepted by the speech input unit into first phoneme string information corresponding to the first variant term;
accumulating and storing the first variant term including the first phoneme string information associated with the base term as the first variant term is detected;
analyzing an occurrence frequency of the first variant term accumulated and stored; and
updating the recognition dictionary to register the first variant term in the recognition dictionary as a variant term of the base term when the occurrence frequency is higher than a first prescribed value that is greater than one.

* * * * *